(12) United States Patent
Kuwahata

(10) Patent No.: US 7,394,610 B2
(45) Date of Patent: Jul. 1, 2008

(54) ACCELERATION SENSOR AND MAGNETIC DISK DEVICE USING THE SAME

(75) Inventor: Michihiko Kuwahata, Kirishima (JP)

(73) Assignee: Kyocera Corporation, Kyoto (JP)

( * ) Notice: Subject to any disclaimer, the term of this patent is extended or adjusted under 35 U.S.C. 154(b) by 238 days.

(21) Appl. No.: 11/475,836

(22) Filed: Jun. 27, 2006

(65) Prior Publication Data

US 2007/0008642 A1    Jan. 11, 2007

(30) Foreign Application Priority Data

Jun. 28, 2005   (JP) ............................. 2005-188978
Aug. 29, 2005   (JP) ............................. 2005-247394

(51) Int. Cl.
*G11B 21/02* (2006.01)
*G01P 15/00* (2006.01)

(52) U.S. Cl. .................. 360/75; 73/514.15; 73/514.29; 310/330

(58) Field of Classification Search ....................... None
See application file for complete search history.

(56) References Cited

U.S. PATENT DOCUMENTS

| 5,763,982 | A | 6/1998 | Tabota et al. ................. 310/329 |
| 6,233,801 | B1 | 5/2001 | Tabota et al. ................. 29/25.35 |
| 6,980,388 | B2 * | 12/2005 | Ishikawa et al. .............. 360/75 |
| 2004/0012308 | A1 * | 1/2004 | Riedel ........................ 310/330 |
| 2004/0129079 | A1 * | 7/2004 | Kato et al. ................. 73/514.15 |
| 2006/0072236 | A1 * | 4/2006 | Ito et al. ........................ 360/75 |
| 2007/0151339 | A1 * | 7/2007 | Watanabe ................. 73/514.29 |

FOREIGN PATENT DOCUMENTS

| JP | 05-052571 | 3/1993 |
| JP | 07-036064 | 7/1995 |
| JP | 08-201418 | 8/1996 |
| JP | 10208438 A | 8/1998 |
| JP | 2000-321299 | 11/2000 |
| JP | 2003-107042 | 4/2003 |

OTHER PUBLICATIONS

Korean language Notice of Allowance and its English translation for corresponding Korean application 2006-57887 lists the references above.

* cited by examiner

*Primary Examiner*—Andrew L. Sniezek
(74) *Attorney, Agent, or Firm*—Hogan & Hartson LLP

(57) ABSTRACT

An acceleration sensor comprises a vibrating element 2 formed by arranging conductor films 26 and 29 on outer main surfaces of piezoelectric substrates 21 and 22 in a rectangular parallelepiped shape, and first supporting members 3a and 3b for holding a part of the vibrating element 2, the first supporting members 3a and 3b being composed of an elastic body, and a bending point of the vibrating element being positioned within a supporting region 91 held between the first supporting members 3a and 3b. This causes a region, which is distorted, in each of the piezoelectric substrates 21 and 22 to be enlarged. Therefore, the amount of charges to be generated is increased so that an output voltage is increased, which allows acceleration detection sensitivity to be further enhanced.

14 Claims, 19 Drawing Sheets

91　92

91　92

91　92

Reaction Electric Charge (C/mm$^2$)

$6.957 \times 10^{-16} \sim 8.573 \times 10^{-16}$ $5.340 \times 10^{-16} \sim 6.957 \times 10^{-16}$ $3.724 \times 10^{-16} \sim 5.340 \times 10^{-16}$ $2.107 \times 10^{-16} \sim 3.724 \times 10^{-16}$ $4.908 \times 10^{-17} \sim 2.107 \times 10^{-16}$ $0 \sim 4.908 \times 10^{-17}$

ACCELERATION SENSOR AND MAGNETIC DISK DEVICE USING THE SAME

BACKGROUND OF THE INVENTION

1. Field of the Invention

The present invention relates to an acceleration sensor using a piezoelectric substrate, and particularly to a small-sized and high-sensitivity acceleration sensor.

2. Description of Related Art

Acceleration sensors have been conventionally used for applications such as detection of shock applied from the exterior to electronic equipment such as hard disk drives.

For example, acceleration sensors of such a type that charge detection electrodes are arranged on both main surfaces of a piezoelectric substrate in a rectangular parallelepiped shape to produce a vibrating element, and its end is supported by a supporting member have been known (see JP 2000-321299 A, and JP 7-36064 U, for example).

In such an acceleration sensor, the vibrating element is deflected by applied acceleration so that the piezoelectric substrate is distorted, and charges are generated in the charge detection electrodes formed on both the main surfaces of the piezoelectric substrate by a piezoelectric effect.

The acceleration is detected by the charges or a voltage generated between the charge detection electrodes by the charges.

Which of the charges and the voltage should be utilized to detect the acceleration differs depending on an acceleration detection device that detects acceleration utilizing the acceleration sensor. Generally, acceleration detection sensitivity in a case where the acceleration is detected by the generated charges is referred to as "charge sensitivity", and acceleration detection sensitivity in a case where the acceleration is detected by the generated voltage is referred to as "voltage sensitivity". It is desirable that the charge sensitivity and the voltage sensitivity are higher as the acceleration sensor.

For example, an output voltage V in a case where a force F produced by acceleration is applied to an acceleration sensor in which one end in the longitudinal direction of a bimorph-type vibrating element obtained by affixing two piezoelectric substrates in a rectangular parallelepiped shape to each other in the thickness direction is as follows, letting D be the piezoelectric constant of the piezoelectric substrate, L be the length of a free vibration region, which is not held by the supporting member, in the vibrating element, letting W be the width of the vibrating element, and T be the thickness of the vibrating element:

$$V=(3/2) \cdot D \cdot L \cdot F/(W \cdot T)$$

The output voltage V is proportional to the length L of the free vibration region in the vibrating element, and is inversely proportional to the width W and the thickness T of the vibrating element.

Although the length L of the free vibration region in the vibrating element must be increased to reduce the width W and the thickness T of the vibrating element in order to improve the acceleration detection sensitivity of the acceleration sensor, therefore, the increase in the length L of the free vibration region in the vibrating element leads to the increase in size of the acceleration sensor, and the reduction in the width W and the thickness T of the vibrating element leads to the reduction in mechanical strength to reduce reliability.

SUMMARY OF THE INVENTION

An object of the present invention is to provide an acceleration sensor being small in size and being high in acceleration detection sensitivity and reliability, and to provide a magnetic disk device using the same.

An acceleration sensor according to the present invention comprises a vibrating element in which charge detection electrodes opposed to each other are arranged on both main surfaces of a piezoelectric substrate in a rectangular parallelepiped shape, and a first supporting member for supporting the vibrating element. The vibrating element includes a supporting region supported in contact with the first supporting member, and a free vibration region having a longitudinal length larger than that in the supporting region and not supported by the first supporting member. The first supporting member is composed of an elastic body.

In the configuration of the present invention, the first supporting member is composed of an elastic body, so that a portion, positioned within the supporting region, in the piezoelectric substrate is also distorted due to the deflection of the vibrating element. Accordingly, a region, which is distorted, in the piezoelectric substrate becomes larger, as compared with that in a case where the first supporting member is formed of a non-elastic body, as in the conventional acceleration sensor. Therefore, the amount of charges to be generated is increased so that an output voltage is increased, which allows acceleration detection sensitivity to be enhanced. The length of the vibrating element is not increased, not leading to the increase in size of the acceleration sensor, and the width and the thickness of the vibrating element are not reduced, not leading to the reduction in reliability due to lack of mechanical strength.

A bending point of the vibrating element is positioned within the supporting region held by the first supporting member. "Bending point" is the boundary between a portion, which is deflected, in the vibrating element and a portion, which is not deflected, in the vibrating element. Accordingly, a region, which is distorted, in the piezoelectric substrate becomes larger, as compared with that in a case where there exists a bending point in the boundary between the supporting region and the free vibration region, as in the conventional acceleration sensor, that is, in a case where the vibrating element starts to be deflected at the boundary between the supporting region and the free vibration region. Therefore, the amount of charges to be generated is increased so that an output voltage is increased, which allows acceleration detection sensitivity to be enhanced.

It is preferable that the modulus of elasticity of the first supporting member is 10 MPa to 10 GPa. When the modulus of elasticity of the first supporting member is set in this range, the first supporting member is easily deformed by a force received from the vibrating element, so that the vibrating element is easily deflected within the supporting region.

It is preferable that the acceleration sensor according to the present invention further comprises a second supporting member for supporting the first supporting member in a direction perpendicular to both the main surfaces of the piezoelectric substrate, and the modulus of elasticity of the first supporting member is lower than the modulus of elasticity of the second supporting member.

In a case where the acceleration sensor further comprises the second supporting member, and the modulus of elasticity of the second supporting member is set to a value larger than the modulus of elasticity of the first supporting member, the second supporting member is difficult to deform. Consequently, the problem that "the deformation of the vibrating element itself is restrained by the deformation of the second supporting member, resulting in reduced acceleration detection sensitivity" does not easily arise.

It is preferable that the modulus of elasticity of the first supporting member is 10 MPa to 10 GPa, and the modulus of elasticity of the second supporting member is 10 GPa to 500 GPa.

The acceleration sensor according to the present invention may have a configuration in which the first supporting member extends toward a maximum amplitude region of the vibrating element farther than the second supporting member.

Here, "maximum amplitude region" is a region where the amplitude of deflection vibration in the vibrating element reaches its maximum. In a case where the vicinity of one end in the longitudinal direction of the vibrating element is a supporting region, the vicinity of the other end is the maximum amplitude region. In a case where the vicinity of the center in the longitudinal direction of the vibrating element is a supporting region, the vicinities of both the ends thereof are the maximum amplitude regions. In a case where the vicinities of both the ends thereof in the longitudinal direction of the vibrating element are supporting regions, the vicinity of the center is the maximum amplitude region.

According to the configuration in which the first supporting member extends toward the maximum amplitude region of the vibrating element farther than the second supporting member, a portion, which is not held by the second supporting member, in the first supporting member exists. This portion, together with the vibrating element, is deflected to some extent while regulating the deflection of the vibrating element, so that the vibrating element is also deflected in this portion. In the vibrating element, both deflection starting at an end of a region held by the first supporting member and deflection starting at an end of a region also held by not only the first supporting member but also the second supporting member occur. Therefore, a region, which is distorted, in the piezoelectric substrate is enlarged. Therefore, the amount of charges to be generated is increased so that an output voltage is increased, which allows acceleration detection sensitivity to be enhanced.

Letting $\alpha$ be the length by which the first supporting member extends farther than the second supporting member and $\beta$ be the length of the free vibration region in the longitudinal direction of the vibrating element, it is desirable that $0.05 \leq \alpha/(\alpha+\beta) \leq 0.1$.

It is desirable that the charge detection electrodes arranged so as to be opposed to each other on both the main surfaces of the piezoelectric substrate are arranged in the free vibration region and a portion, in close proximity to the free vibration region, within the supporting region on both main surfaces of the vibrating element.

In this configuration, the charge detection electrodes are arranged in the free vibration region and the portion, in close proximity to the free vibration region, within the supporting region on both the main surfaces of the vibrating element. Of course, the charge detection electrodes are not arranged in a portion, spaced apart from the free vibration region, within the supporting region. In the acceleration sensor according to the present invention, when acceleration is applied, the piezoelectric substrate is distorted in not only the free vibration region but also the portion, in close proximity to the free vibration region, within the supporting region. Therefore, the charge detection electrodes are also arranged in the portion, in close proximity to the free vibration region, within the supporting region, so that charges generated in the free vibration region as well as charges generated in the portion, in close proximity to the free vibration region, within the supporting region can be accepted in the charge detection electrode. Therefore, the amount of charges stored in the charge detection electrode is increased, and a potential difference occurring between the charge detection electrodes on both the main surface of the vibrating element is also increased. Accordingly, charges and a voltage generated by applied acceleration are increased, so that an acceleration sensor having high acceleration detection sensitivity can be obtained.

The charge detection electrodes are not arranged in the portion, spaced apart from the free vibration region, in the supporting region, so that the whole area of the charge detection electrodes is reduced so that a static capacitance between the charge detection electrodes on both the main surfaces of the vibrating element is reduced, as compared with that in a case where the charge detection electrodes are also arranged in the portion, spaced apart from the free vibration region, in the supporting region.

Letting Q be the amount of charges stored in the charge detection electrode by applied acceleration, letting V be a potential difference occurring between the charge detection electrodes on both the main surfaces of the vibrating element, and C be a static capacitance between the charge detection electrodes on both the main surfaces of the vibrating element, $V=Q/C$. If the charge amount Q is constant, and the static capacitance C is reduced, the potential difference V is increased. That is, the charge detection electrodes are not arranged in the portion, spaced apart from the free vibration region, within the supporting region, so that the amount of charges Q stored in the charge detection electrode by applied acceleration is hardly changed, and the static capacitance C between the charge detection electrodes on both the main surfaces of the vibrating element is reduced, so that the potential difference V occurring between the charge detection electrodes on both the main surfaces of the vibrating element is increased. Accordingly, an acceleration sensor having high voltage sensitivity in a case where the applied acceleration is detected by the change in voltage can be obtained.

Letting $\gamma$ be the length of a portion, where the charge detection electrode is arranged, within the supporting region, and $\delta$ be the length of the free vibration region in the longitudinal direction of the vibrating element, it is desirable that $0.15 \leq \gamma/\delta \leq 0.3$.

Furthermore, according to the acceleration sensor in the present invention, in the above-mentioned configuration, the piezoelectric substrate in the vibrating element comprises a plurality of piezoelectric substrates laminated in the thickness direction, a charge detection electrode being further arranged between the piezoelectric substrates so as to be opposed to the charge detection electrodes on both the main surfaces (outer main surfaces) with the piezoelectric substrates sandwiched therebetween.

In this case, the charge detection electrode arranged between the piezoelectric substrates is arranged in such a position and a shape that it is overlapped with the charge detection electrodes arranged on the outer main surfaces of the vibrating element in the thickness direction. This causes charges from being generated in the charge detection electrodes respectively arranged on both the main surfaces of each of the piezoelectric substrates, so that the amount of charges generated in the whole vibrating element is increased. Therefore, the charge sensitivity in a case where the acceleration is detected utilizing the generated charges can be enhanced.

Furthermore, according to the acceleration sensor in the present invention, in the above-mentioned configuration, each of the plurality of piezoelectric substrates has a first pullout electrode pulled out to its one side surface from the charge detection electrode arranged on its one main surface, and has a second pullout electrode pulled out to the other side surface from the charge detection electrode arranged on the other main surface.

In such a case, all the charge detection electrodes can be pulled out to both the side surfaces of the vibrating element through both the pullout electrodes and can be easily electrically connected to the exterior of the vibrating element. Thus, the necessity of forming via holes for electrically connecting the charge detection electrode positioned between the piezoelectric substrates to the exterior of the vibrating element is eliminated. Therefore, an acceleration sensor having a simple configuration and capable of simplifying manufacturing steps can be obtained.

The charge detection electrodes can be electrically connected to the exterior of the vibrating element on both the side surfaces of the vibrating element, so that spacing between connections to the exterior of the vibrating element can be made larger, as compared with that "in a case where pullout electrodes are pulled out and exposed to an end surface of the vibrating element, and is electrically connected to the exterior of the vibrating element on the end surface of the vibrating element". This can reduce the possibility that there is an electrical short between the first pullout electrode and the second pullout electrode as in a case where the pullout electrodes and the exterior of the vibrating element are connected to each other using solder, conductive adhesives, or the like having fluidity.

A magnetic disk device according to the present invention carries the acceleration sensor according to the present invention in order to detect acceleration applied to the magnetic disk device. When the acceleration sensor always monitors the acceleration applied to the magnetic disk device, compares data representing the acceleration with a threshold value previously set, and judges that the acceleration data exceeds the threshold value, a magnetic head is made to retreat, so that the magnetic disk device can be previously prevented from being damaged due to shock between the magnetic head and the magnetic disk even if strong acceleration is applied to the magnetic disk device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view showing the appearance of a vibrating element shown in FIG. 2 wherein a first supporting member is seen through;

DESCRIPTION OF THE PREFERRED EMBODIMENTS

Figure 1:
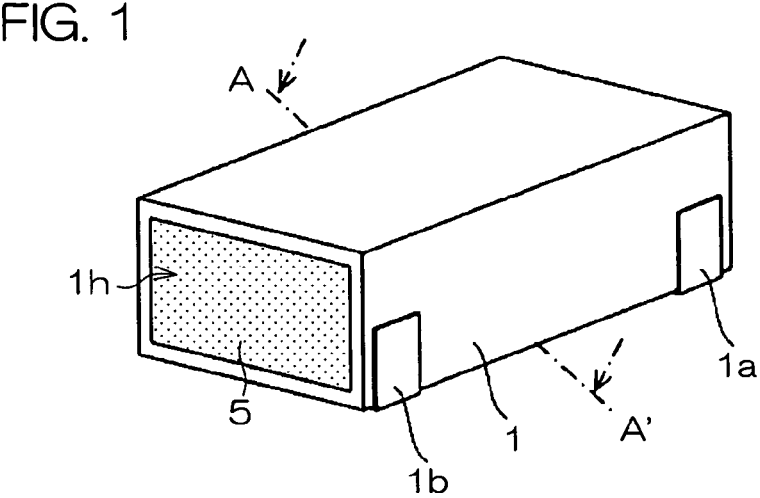
FIG. 1 is a perspective view schematically showing the appearance of an acceleration sensor according to an embodiment of the present invention.

FIG. 1 is a perspective view of the appearance of an acceleration sensor according to an embodiment of the present invention. The acceleration sensor has a configuration in which a vibrating element 2 (shown in FIG. 2) is accommodated within a case 1 having lead electrodes 1a and 1b, and an opening 1h of the case 1 is sealed with sealing resin 5.

The case 1 is a container in a rectangular parallelepiped shape and having the opening 1h at its one end. Suitably used as a material therefor are high-strength plastic materials such as liquid crystal polymer (LCP), polyphenylene sulfide (PPS), and polyether ether ketone (PEEK) and ceramic materials such as alumina.

The lead electrodes 1a and 1b serving to mechanically fix and electrically connect the acceleration sensor to a mounting substrate or the like are attached to the case 1. The lead electrodes 1a and 1b are for electrical connection and fixing to an external circuit wiring board (not shown) with solder or the like.

An example of a material for the lead electrodes 1a and 1b is phosphor bronze, for example, and the thickness thereof is set to 0.1 to 0.5 mm, for example. In the acceleration sensor according to the present embodiment, the lead electrodes 1a and 1b are integrally molded into the case 1 by insert molding.

The sealing resin 5 is formed so as to close the opening 1h of the case 1, and epoxy resin, for example, is used as a material for the sealing resin 5.

Figure 2:
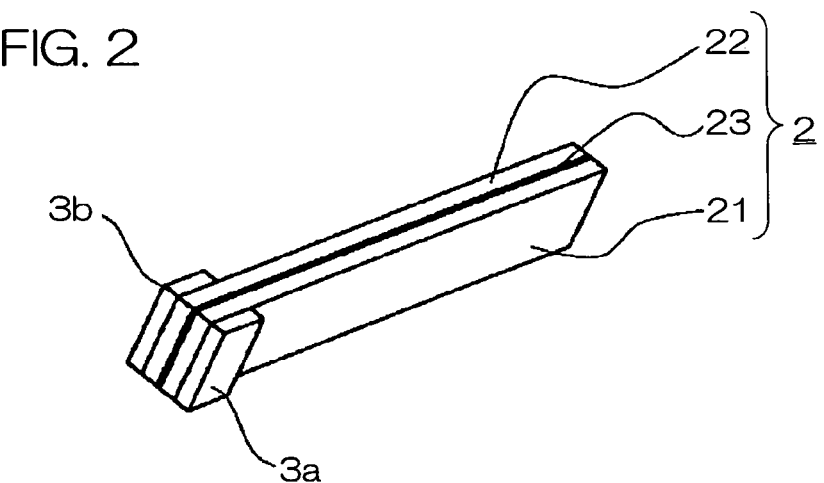
FIG. 2 is a perspective view schematically showing the appearance of a vibrating element used for the acceleration sensor according to the embodiment of the present invention.

FIG. 2 is a perspective view schematically showing the appearance of the vibrating element 2 used for the acceleration sensor according to the present embodiment and first supporting members 3a and 3b for holding one end of the vibrating element 2 therebetween.

Figure 3:
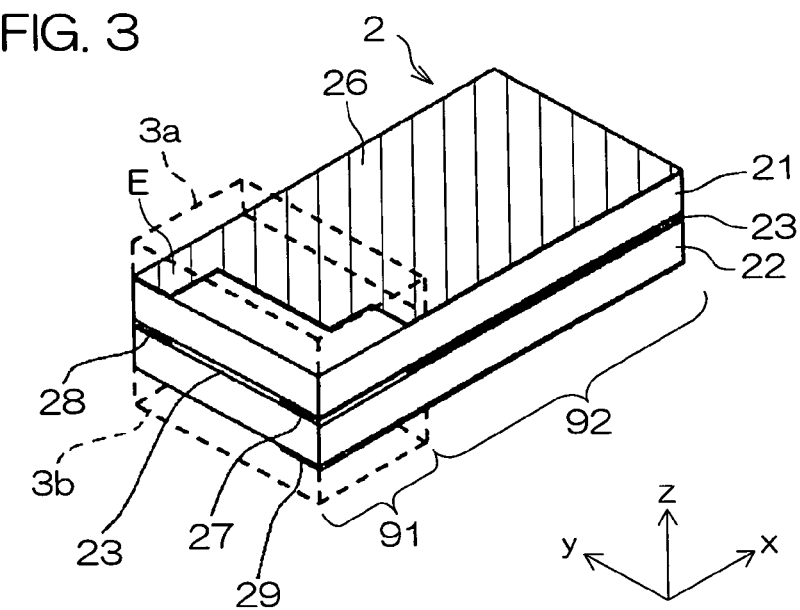

FIG. 3 is a perspective view showing the vibrating element 2 from another angle, showing the first supporting members 3a and 3b in perspective.

The vibrating element 2 is so configured that a piezoelectric substrate 21 in a rectangular parallelepiped shape having a pair of conductor films 26 and 27 applied to both its main surfaces and a piezoelectric substrate 22 in a rectangular parallelepiped shape having a pair of conductor films 28 and 29 applied to both its main surfaces are affixed to each other through adhesives 23 having insulating properties. The conductor films 27 and 28 are insulated from each other with the adhesives 23. This configuration is generally referred to as a "bimorph type".

The piezoelectric substrates 21 and 22 are polarized in the thickness direction such that their directions of polarization are opposite to each other, and examples of a material therefor are piezoelectric ceramic materials such as zirconate titanate and lead titanate. The piezoelectric substrates 21 and 22 are formed in a rectangular parallelepiped shape having a length of 0.5 to 5.0 mm, having a width of 0.2 to 1.0 mm, and having a thickness of 0.1 to 1.0 mm, for example.

The following manufacturing method is employed for producing the piezoelectric substrates 21 and 22: a manufacturing method comprising (1) a process of adding a binder to raw material powder and press-molding a mixture obtained, or mixing and drying raw material powder, together with water and a dispersant, using a ball mill, and adding a binder, a solvent, a plasticizer, or the like to a mixture obtained to mold the mixture into a sheet shape by a doctor blade method, (2) a process of calcining the molded member at a peak temperature of 1100° C. to 1400° C. for several ten minutes to several hours to form the substrates, and (3) a process of subjecting the substrates to polarization processing in the thickness direction upon application of a voltage of 3 kV/mm to 15 kV/mm at a temperature of 60° C. to 150° C., for example.

The conductor films 26, 27, 28, and 29 applied to both the main surfaces of the piezoelectric substrates 21 and 22 are formed by forming a metal material having good conductive properties such as gold, silver, copper, chromium, nickel, tin, lead, or aluminum, for example, on both the main surfaces of the piezoelectric substrates 21 and 22 by vacuum evaporation, sputtering, or the like, or applying a predetermined conductor paste containing the above-mentioned metal material in a predetermined pattern by a conventionally well-known printing method or the like and baking the applied conductor paste at high temperatures. It is desirable that the thickness is in a range of 0.1 to 3 μm.

Used as a material for the adhesives 23 for affixing the piezoelectric substrates 21 and 22 to each other are insulating materials such as glass-cloth base material epoxy resin, inorganic glass, and epoxy resin.

In joining using the glass-cloth base material epoxy resin, the upper and lower piezoelectric substrates are overlapped with a prepreg material impregnated with epoxy resin sandwiched between glass fibers, and are heated while being pressurized, to compress and cure the epoxy resin to a predetermined thickness.

In joining using the inorganic glass, glass pastes are printed and applied, the piezoelectric substrates are then overlapped, are heated to 300° C. to 700° C. using a calcination furnace while applying a load, and are melted and integrated. In the case of calcination, the inclusion of air bubbles into a glass joining intermediate layer can be restrained if the calcination has been performed in a vacuum furnace. Particularly in the case of joining at a high temperature of not less than 300° C., the piezoelectric substrate is depolarized, so that it must be subjected to polarization processing again after the joining.

The first supporting members 3a and 3b are members for holding the vibrating element 2 on both its main surfaces. A region, which is held between the first supporting members 3a and 3b, in the vibrating element 2 is referred to as a "supporting region 91". A region, which is not held between the first supporting members 3a and 3b, in the vibrating element 2 is referred to as a "free vibration region 92".

The length in the longitudinal direction (x-direction) of the free vibration region 92 is larger than the length in the longitudinal direction (x-direction) of the supporting region 91.

The modulus of elasticity of the first supporting members 3a and 3b is preferably in a range of 10 MPa to 10 GPa and particularly preferably in a range of 1 to 10 GPa.

Suitably used as a material for the first supporting members 3a and 3b is silicone resin, epoxy resin, etc. having a modulus of elasticity of approximately 6 GPa. The thickness thereof is preferably in a range from 20 to 100 μm. It is desirable that the width direction (y-direction) of the first supporting members 3a and 3b extends over the whole vibrating element 2, and it is desirable that the length direction (x-direction) thereof is formed over a range of 0.5 to 1.5 mm from one end (an end at which the first supporting members 3a and 3b are mounted) of the vibrating element 2.

Such a method of forming the first supporting members 3a and 3b will be described. (1) A piezoelectric sheet having portions serving as a large number of piezoelectric substrates 21 and 22 is first prepared, and a resin paste that is the material for the first supporting members 3a and 3b is printed by screen printing and cured at a predetermined position of each of main surfaces of the sheet. The screen printing may be done a plurality of times, as required, or a surface of the cured resin paste may be polished so as to provide thickness precision. (2) The piezoelectric sheet is cut using a dicing saw or the like such that the first supporting members 3a and 3b and the vibrating element 2 each having a predetermined length are obtained while confirming the position of the cured resin paste. This allows the vibrating element 2 having the first supporting members 3a and 3b made to adhere thereto to be obtained.

The shape of the vibrating element 2 thus obtained is 3 mm in length, 0.5 mm in width, and 0.3 mm in thickness, for example. The length of the supporting region 91 that is held between the first supporting members 3a and 3b is 1 mm, and the length of the free vibration region 92 that is not held between the first supporting members 3a and 3b is 2 mm. In the following description, one end (an end on the side of the region that is held between the first supporting members 3a and 3b) of the vibrating element 2 shall be referred to as a "fixing end", and the other end thereof shall be referred to as a "free end".

Figure 4:
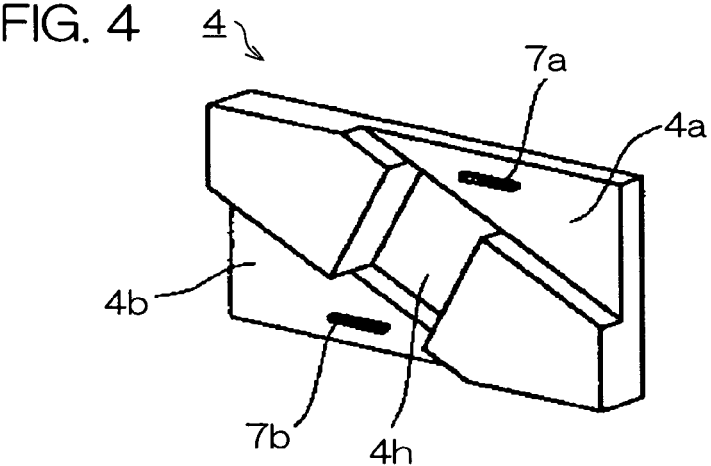
FIG. 4 is a perspective view schematically showing the appearance of a second supporting member used for the acceleration sensor according to the embodiment of the present invention.

FIG. 4 is a perspective view showing the appearance showing a second supporting member 4 used for the acceleration sensor according to the present embodiment.

The second supporting member 4 is a member provided in the vicinity of the opening 1h in the case 1 for holding the exterior of the first supporting members 3a and 3b in the vibrating element 2 to support the vibrating element 2.

The second supporting member 4 is provided with a through hole 4h into which the vibrating element 2 is to be inserted. The vibrating element 2 can be fixed to the case 1, by inserting the vibrating element 2 into the through hole 4h at the free end and pressing the first supporting members 3a and 3b attached to the fixed end into the through hole 4h to further hold the exterior of the first supporting members 3a and 3b by the second supporting member 4.

The second supporting member 4 is provided with recesses 4a and 4b for potting conductive adhesives 6a and 6b, described later, and the recesses 4a and 4b are respectively provided with holes for exposing ends 7a and 7b of the lead electrodes 1a and 1b extending through the case 1.

Figure 5:
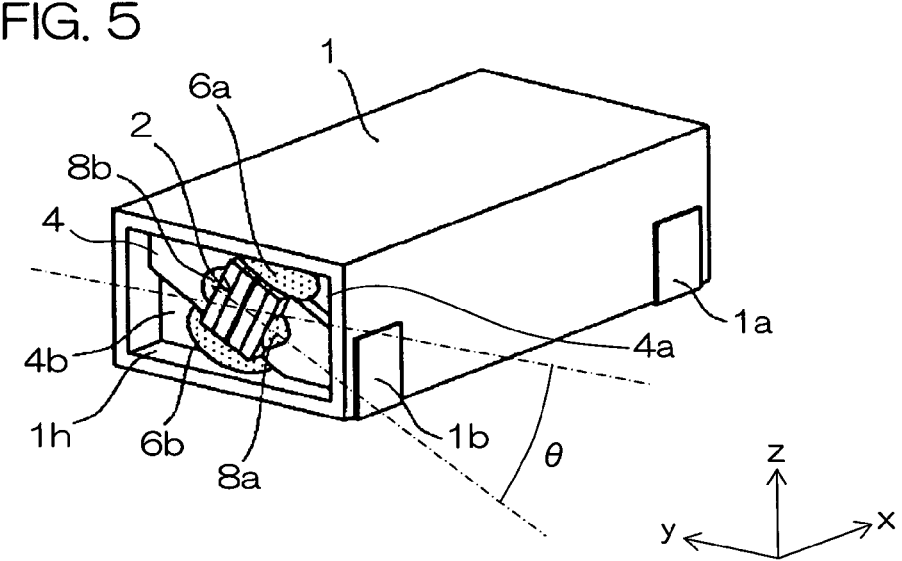
FIG. 5 is a perspective view showing the appearance, excluding sealing resin, of the acceleration sensor shown in FIG. 1.

FIG. 5 is a perspective view excluding the sealing resin 5 in the acceleration sensor shown in FIG. 1.

A part of each of the conductor films 26 and 27 formed on the piezoelectric substrates 21 and 22 is formed so as to extend to a side peripheral edge of the piezoelectric substrate, as shown in FIG. 3. This part is referred to as a "pullout electrode E" of the conductor film.

The pullout electrode E is electrically connected to the ends 7a and 7b of the lead electrodes 1a and 1b through the conductive adhesives 6a and 6b, respectively, in the recesses 4a and 4b of the second supporting member 4, as shown in FIG. 5. Consequently, output voltage generated between the conductor films 26 and 27 and between the conductor films 28 and 29 are respectively outputted to the exterior from the lead electrodes 1a and 1b.

The conductive adhesives 6a and 6b have a conductive filler contained within adhesive resin. Desirable as the conductive filler are metals, having good conductive properties, such as silver and copper. Usable as the adhesive resin is one cured at a temperature of less than 300° C. such that the piezoelectric substrates 21 and 22 are not depolarized. Therefore, epoxy resin, for example, is suitably used.

The conductive adhesives 6a and 6b are respectively prevented from spreading when they are potted by the recesses 4a and 4b.

Weirs 8a and 8b made of resin are respectively provided from a surface of the second supporting member 4 to the pair of first supporting members 3a and 3b. The weirs 8a and 8b are for respectively preventing the conductive adhesives 6a (6b) from flowing to reach the conductive adhesives 6b (6a), so that a short can be prevented from developing between the lead electrodes 1a and 1b.

Figure 6:
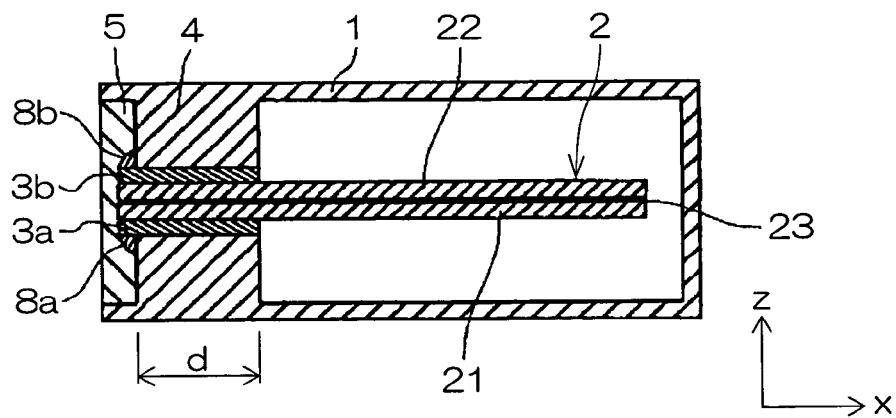
FIG. 6 is a cross-sectional view taken along a line A-A' shown in FIG. 1.

FIG. 6 is a cross-sectional view taken along a line A-A' shown in FIG. 1. The second supporting member 4 is provided in the vicinity of the opening 1h in the case 1, and is integrally formed as a part of the case 1 using the same material as the case 1. If the second supporting member 4 is thus integrally formed, the manufacture thereof becomes easy. The second supporting member 4 may be produced separately from the case 1 and fitted into the opening 1h in the case 1.

The length d of the second supporting member 4 in the longitudinal direction (x-direction) of the vibrating element 2 is 0.5 to 1.5 mm, and the exterior of the first supporting members 3a and 3b is held in the length d.

Figure 36:
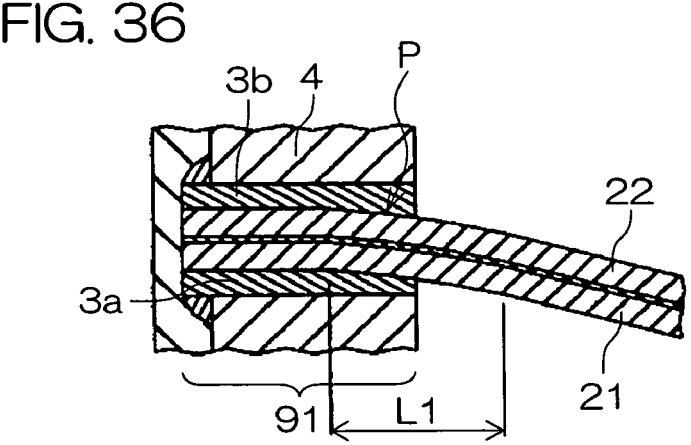
Figure 37:
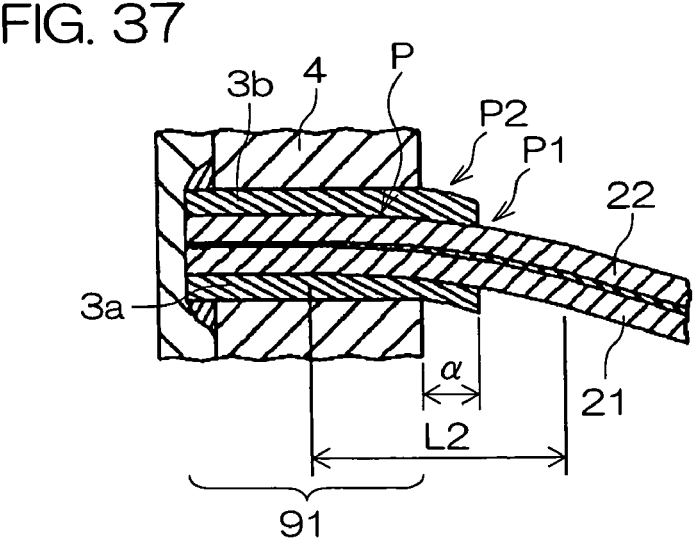

One feature of the acceleration sensor according to the present invention is that the first supporting members 3a and 3b are formed of an elastic body. Thus, the first supporting members 3a and 3b are deformed by a force received from the vibrating element 2, so that the vibrating element 2 can be deflected not only in the free vibration region 92 but also the supporting region 91. In this case, a bending point P of the vibrating element 2 will be positioned within the supporting region 91 held between the first supporting members 3a and 3b, as shown in FIGS. 36 and 37. This causes the piezoelectric substrates 21 and 22 positioned within the supporting region 91 to be also distorted due to the deflection of the vibrating element 2.

Figure 35:
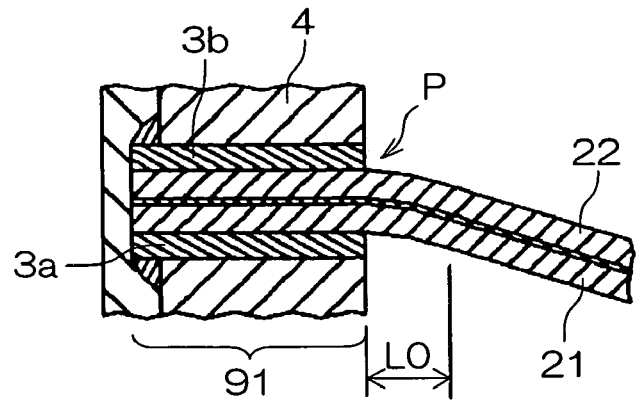
FIGS. 35 to 37 are partially sectional views schematically showing how the vibrating element is deformed.

Accordingly, a region, which is distorted, in the piezoelectric substrates 21 and 22 becomes larger, as compared with that in a case where a bending point P exists in the boundary between the supporting region 91 and the free vibration region 92 as in the conventional acceleration sensor (FIG. 35). Therefore, generated charges are increased so that an output voltage is increased, which allows acceleration detection sensitivity to be enhanced.

The length of the free vibration region in the vibrating element 2 is not increased, not leading to the increase in size of the acceleration sensor, and the width and the thickness of the vibrating element 2 are not reduced, not leading to the reduction in reliability due to lack of mechanical strength.

An additional feature of the acceleration sensor according to the present embodiment is that the modulus of elasticity of the second supporting member 4 is made higher than the modulus of elasticity of the first supporting members 3a and 3b. It is desirable that the modulus of elasticity of the second supporting member 4 is not less than two times the modulus of elasticity of the first supporting members 3a and 3b. The modulus of elasticity of the second supporting member 4 is thus made higher than the modulus of elasticity of the first supporting members 3a and 3b so that the second supporting member 4 is difficult to deform.

If the modulus of elasticity of the second supporting member 4 is made approximately the same as or lower than the modulus of elasticity of the first supporting members 3a and 3b, the second supporting member 4, together with the first supporting members 3a and 3b, is greatly deformed when shock is applied to the acceleration sensor. This causes shock inherently applied to the vibrating element 2 to be absorbed by the second supporting member 4. Consequently, the deformation of the vibrating element 2 is reduced, resulting in reduced acceleration detection sensitivity.

In the present embodiment, the modulus of elasticity of the second supporting member 4 is made higher than the modulus of elasticity of the first supporting members 3a and 3b. Therefore, shock is applied as it is to the vibrating element 2, so that the vibrating element 2 is greatly deformed, which can prevent acceleration detection sensitivity from being reduced.

The modulus of elasticity of the second supporting member 4 is preferably around 10 to 500 GPa, more preferably around 20 to 500 GPa, and particularly preferably around 20 to 400 GPa.

Here, description is made of a method of measuring the respective moduli of elasticity of a material for the first supporting members 3a and 3b and a material for the second supporting member 4.

An example of the modulus of elasticity is "modulus of elasticity in flexure; flexural modulus Ef". Letting $\sigma 1$ and $\sigma 2$ respectively be stresses corresponding to distortions $\epsilon 1 = 0.0005$ and $\epsilon 2 = 0.0025$ at two defined points, the modulus of elasticity in flexure Ef is a difference in distortion ($\epsilon 2 - \epsilon 1$) divided by a difference in stress ($\sigma 2 - \sigma 1$), that is:

$$Ef = (\sigma 2 - \sigma 1)/(\epsilon 2 - \epsilon 1)$$

The unit of the modulus of elasticity in flexure Ef is MPa.

In the specification, the present invention is carried out on the basis of JIS K7171 if there is particularly no problem. JIS K7171 is the same standard as ISO 178; 1993 (Plastics-Determination of flexural properties) That is, a specimen is produced using the same material as a member whose modulus of elasticity is to be measured, to measure the modulus of elasticity in flexure thereof. Basically, a standard specimen having a length of 80.0 mm, a width of 10.0 mm, and a thickness of 4.0 mm is produced, to measure the modulus of elasticity in flexure Ef under conditions of a temperature of 23° C. and a humidity of 50% RH, letting the distance L between supports be 64 mm, the radius R1 of a penetrator be 5.0 mm, the radius R2 of a supporting stand be 5.0 mm, and the test speed be 2 mm/min.

Used as a material for the second supporting member 4 can be a ceramic material such as alumina. However, resin having a desired modulus of elasticity, for example, liquid crystal polymer (LCP), polyphenylene sulfide (PPS), or polyether ether ketone (PEEK) can be suitably used.

The second supporting member 4 having a desired modulus of elasticity and a desired shape can be easily formed by thus using resin that is easy to process as the material for the second supporting member 4, so that an acceleration sensor having high detection sensitivity can be easily obtained.

When physical shock (acceleration) is applied from the exterior to the vibrating element 2 fixed in the above-mentioned manner, the free vibration region 92 that is not held between the first supporting members 3a and 3b is deflected, and the piezoelectric substrates 21 and 22 affixed to each other are distorted so that charges are generated. Potential differences respectively arise between the conductor films 26 and 27 that have adhered to both main surfaces of the piezoelectric substrate 21 and between the conductor films 28 and 29 that have adhered to both main surfaces of the piezoelectric substrate 22. The potential difference is taken out as an output voltage so that the acceleration is detected.

In the acceleration sensor according to the present embodiment, the vibrating element 2 is fixed so as to be inclined in the horizontal direction, as shown in FIGS. 4 and 5, so that shock from not only the vertical direction but also the horizontal direction can be sensed. Specifically, an angle θ (an acute angle) formed between a mounting surface (an x-y surface) of the case 1 and a surface perpendicular to a main surface of the vibrating element 2 is set in a range of 20° to 50° for purposes.

Figure 7:
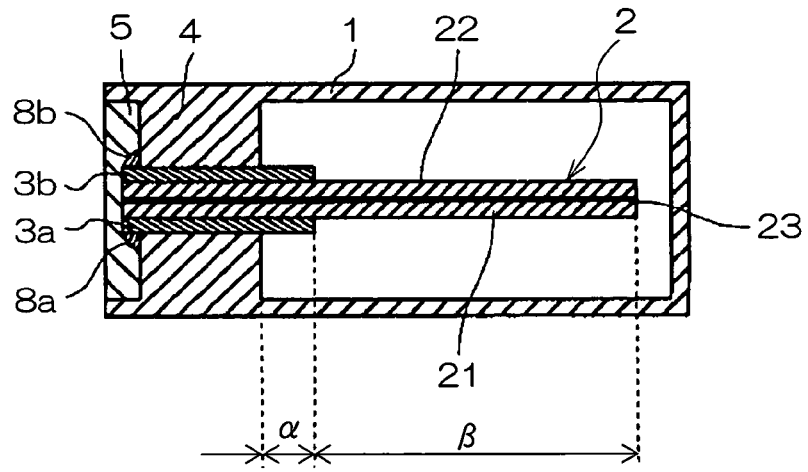
FIG. 7 is a cross-sectional view of an acceleration sensor according to another embodiment of the present invention.

FIG. 7 is a cross-sectional view schematically showing an acceleration sensor according to another embodiment of the present invention. In the acceleration sensor according to the present embodiment, only points different from those in the above-mentioned embodiment are described, and the same constituent elements are assigned the same reference numerals and hence, overlapped description is not repeated.

The characteristic feature of the acceleration sensor shown in FIG. 7 is that first supporting members 3a and 3b extend toward a maximum amplitude region, that is, a free end of the vibrating element 2 farther than the second supporting member 4.

Such a shape causes a portion (indicated by α), which is not held by the second supporting member 4, in the first supporting members 3a and 3b, together with the vibrating element 2, to be deflected to some extent while regulating the deflection of the vibrating element 2, so that the vibrating element 2 is also deflected in this portion.

In the vibrating element 2, both deflection starting at an end (indicated by P1 in FIG. 37) of a region held between the first supporting members 3a and 3b and deflection starting at an end (indicated by P2 in FIG. 37) of a region also held by not only the first supporting members 3a and 3b but also the second supporting member 4 occur. Therefore, a region, which is distorted to generate charges, in the piezoelectric substrate is enlarged. Thus, the generated charges are increased so that an output voltage is increased, which allows acceleration detection sensitivity to be enhanced.

Additionally, in the acceleration sensor according to the present embodiment, the modulus of elasticity of the first supporting members 3a and 3b is made lower than the modulus of elasticity of the second supporting member 4 in the above-mentioned configuration.

Consequently, the portion (α), which is not held by the second supporting member 4, in the first supporting members 3a and 3b, together with the vibrating element 2, is more easily deflected, and the first supporting members 3a and 3b are also deformed by a force received from the vibrating element 2 within a region held by the second supporting member 4 so that the vibrating element 2 can be deflected. Therefore, a region, which is distorted to generate charges, in piezoelectric substrates 21 and 22 is further enlarged. Thus, the generated charges are increased so that an output voltage is increased, which allows acceleration detection sensitivity to be further enlarged.

Figure 8:
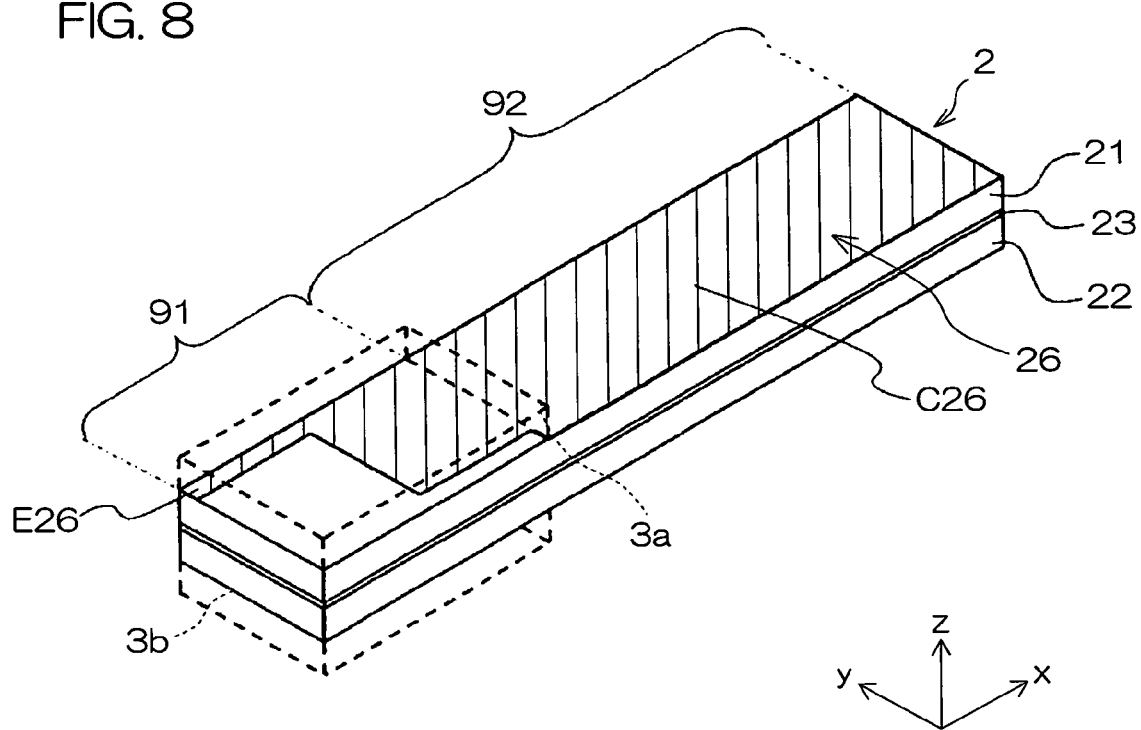
FIG. 8 is a perspective view schematically showing the appearance of a vibrating element and a first supporting member used for an acceleration sensor according to still another embodiment of the present invention.

FIG. 8 is a perspective view schematically showing the appearance of a vibrating element 2 used for an acceleration sensor according to still another embodiment of the present invention, and first supporting members 3a and 3b for holding both main surfaces at one end in the longitudinal direction (x-direction) of the vibrating element 2. FIG. 8 shows the first supporting members 3a and 3b indicated by a broken line in perspective.

Figure 9:
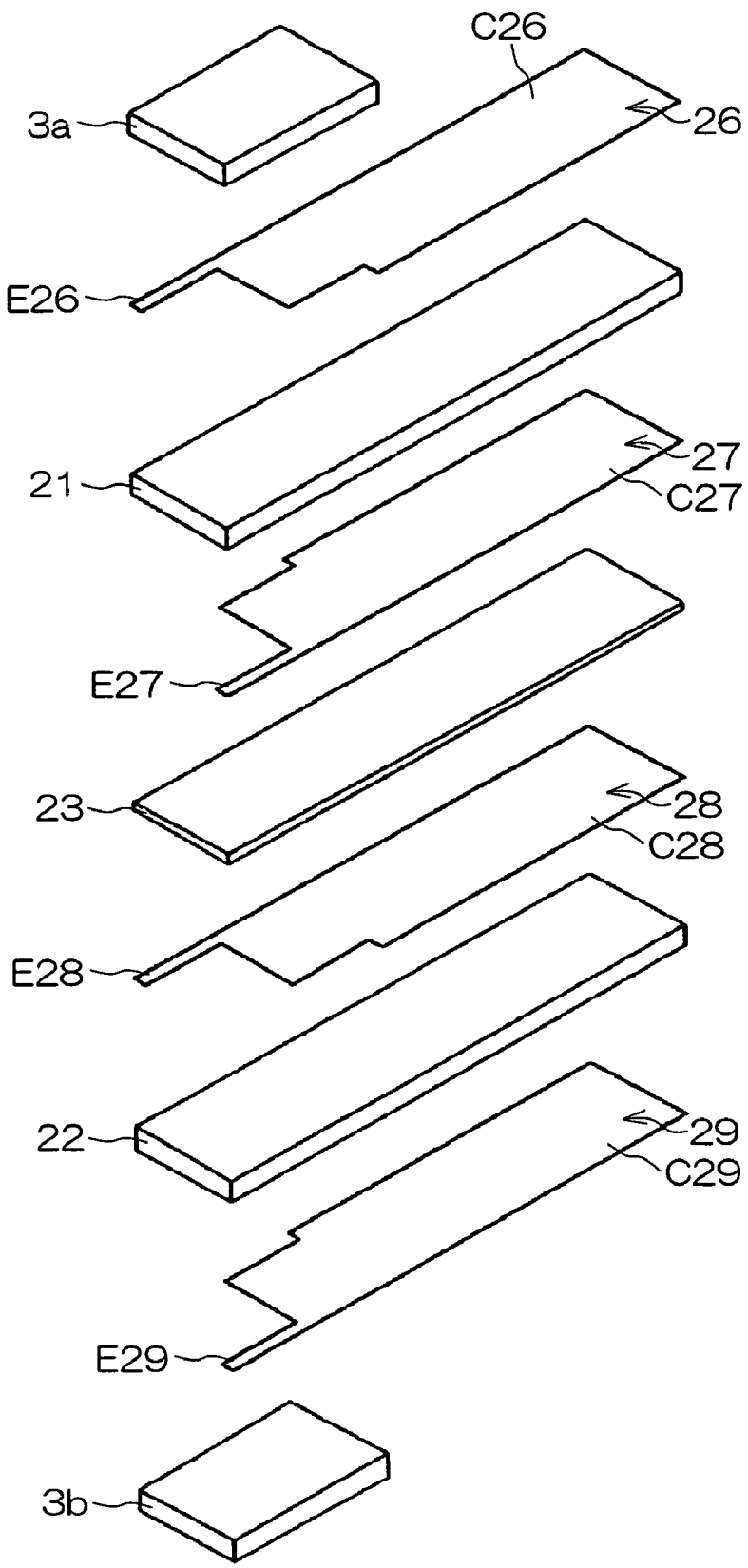
FIG. 9 is an exploded perspective view showing a vibrating element and a first supporting member shown in FIG. 8.

FIG. 9 is a exploded perspective view schematically showing the vibrating element 2 and the first supporting members 3a and 3b shown in FIG. 8.

Figure 10:
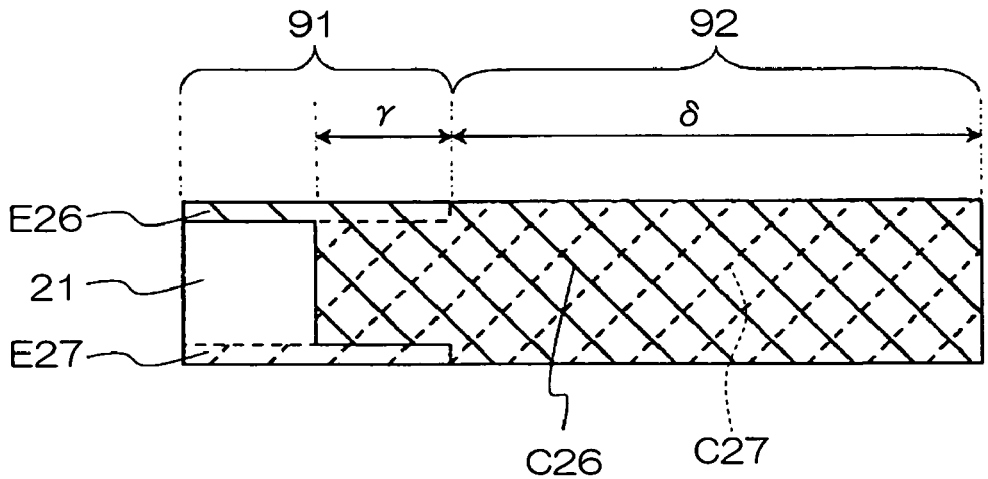
FIGS. 10 to 12 are respectively a perspective view as viewed from the top, a top view, and a bottom view, schematically showing a piezoelectric substrate and conductor films arranged on both main surfaces of the piezoelectric substrate, composing the vibrating element shown in FIG. 9.
Figure 11:
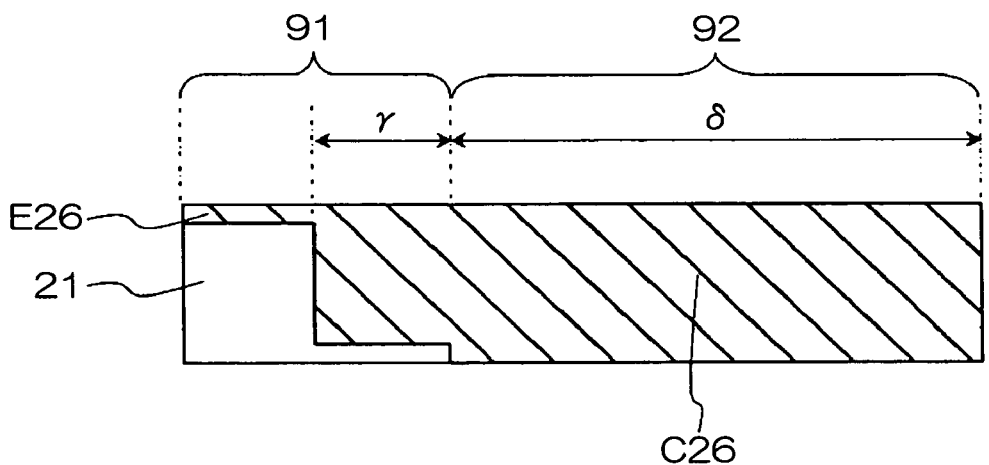
Figure 12:
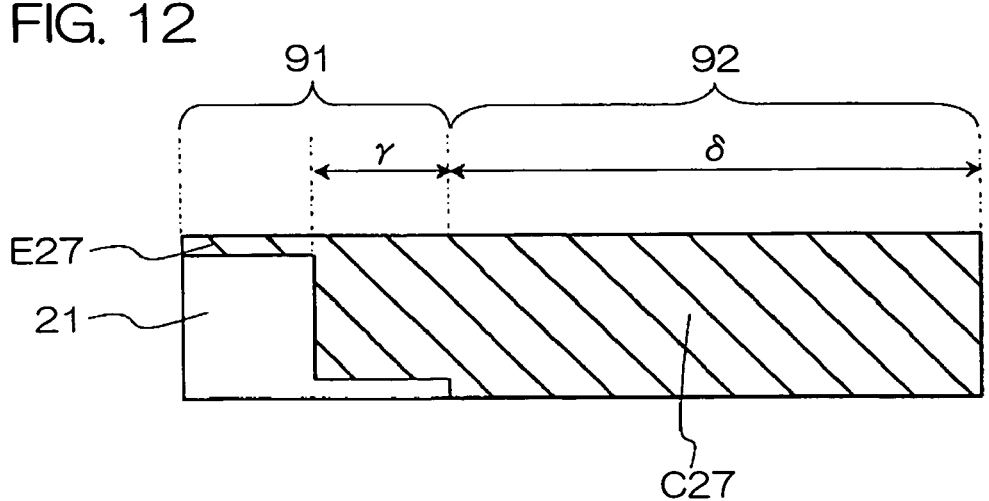

FIGS. 10, 11, and 12 are respectively a perspective view as viewed from the top, a top view, and a bottom view, schematically showing a piezoelectric substrate 21 and conductor films 26 and 27 arranged on both main surfaces of the piezoelectric substrate 21, composing the vibrating element 2 shown in FIG. 9.

Figure 13:
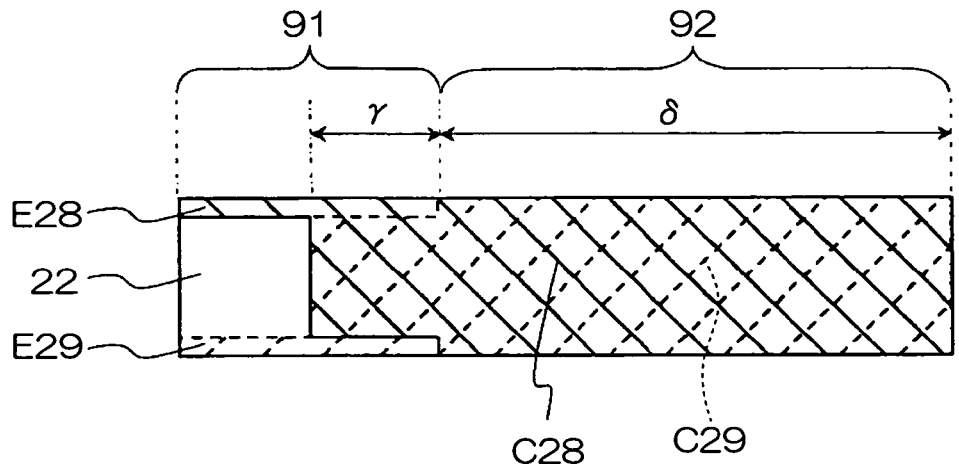
FIGS. 13 to 15 are respectively a perspective view as viewed from the top, a top view, and a bottom view, schematically showing another piezoelectric substrate and conductor films arranged on both main surfaces of the piezoelectric substrate, composing the vibrating element shown in FIG. 9.
Figure 14:
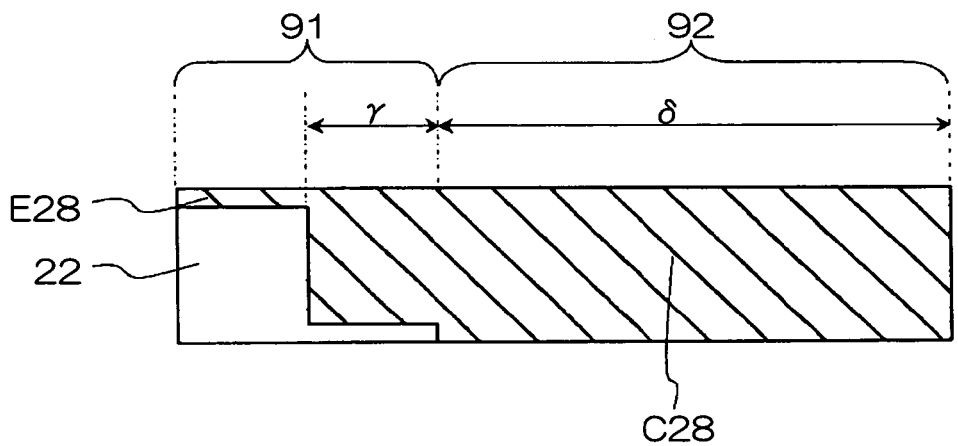
Figure 15:
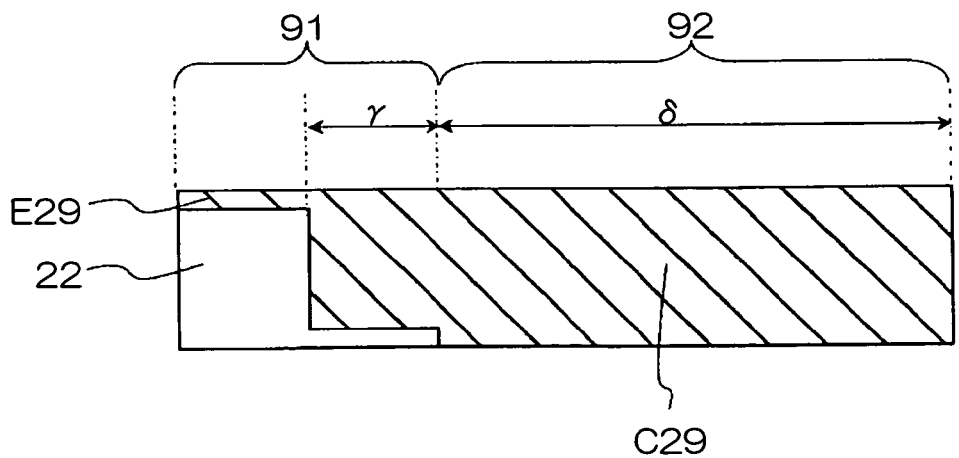

FIGS. 13, 14, and 15 are respectively a perspective view as viewed from the top, a top view, and a bottom view, schematically showing a piezoelectric substrate 22 and conductor films 28 and 29 arranged on both main surfaces of the piezoelectric substrate 22, composing the vibrating element 2 shown in FIG. 9.

The conductor film 26 comprises a charge detection electrode C26 and a pullout electrode E26, and the conductor film 27 comprises a charge detection electrode C27 and a pullout electrode E27. The conductor film 28 comprises a charge detection electrode C28 and a pullout electrode E28, and the conductor film 29 comprises a charge detection electrode C29 and a pullout electrode E29.

As shown in FIGS. 10, 11, and 12, the charge detection electrode C26 is arranged from a free vibration region 92 that is not held between the first supporting members 3a and 3b to the middle of a supporting region 91 that is held between the first supporting members 3a and 3b on an upper surface of the piezoelectric substrate 21 in a rectangular parallelepiped shape, and the pullout electrode E26 pulled out of the charge detection electrode C26 is arranged within the supporting region 91 and is exposed to one side surface of the piezoelectric substrate 21.

On a lower surface of the piezoelectric substrate 21, the charge detection electrode C27 is arranged from the free vibration region 92 to the middle of the supporting region 91, and the pullout electrode E27 pulled out of the charge detection electrode C27 is arranged within the supporting region 91 and is exposed to the other side surface of the piezoelectric substrate 21.

The charge detection electrodes C26 and C27 are arranged so as to be opposed to each other with the piezoelectric substrate 21 sandwiched therebetween. When the piezoelectric substrate 21 is distorted, charges with different signs are respectively generated in the charge detection electrodes C26 and C27 by a piezoelectric effect so that a potential difference occurs between the charge detection electrodes C26 and C27. The pullout electrodes E26 and E27 respectively have the functions of electrically connecting the charge detection electrodes C26 and C27 to the exterior of the vibrating element 2, and are arranged so as not to be opposed to each other with the piezoelectric substrate 21 sandwiched therebetween to prevent a large static capacitance from being generated between the pullout electrodes E26 and E27.

Similarly, as shown in FIGS. 13, 14, and 15, on an upper surface of the other piezoelectric substrate 22 in a rectangular parallelepiped shape, a charge detection electrode C28 is arranged from the free vibration region 92 to the middle of the supporting region 91, and the pullout electrode E28 pulled out of the charge detection electrode C28 is arranged within the supporting region 91 and is exposed to one side surface of the piezoelectric substrate 22. On a lower surface of the piezoelectric substrate 22, a charge detection electrode C29 is arranged from the free vibration region 92 to the middle of the supporting region 91, and the pullout electrode E29 pulled out of the charge detection electrode C29 is arranged within the supporting region 91 and is exposed to the other side surface of the piezoelectric substrate 22.

The charge detection electrodes C28 and C29 are arranged so as to be opposed to each other with the piezoelectric substrate 22 sandwiched therebetween. When the piezoelectric substrate 22 is distorted, charges with different signs are respectively generated in the charge detection electrodes C28 and C29 by a piezoelectric effect so that a potential difference occurs between the charge detection electrodes C28 and C29. The pullout electrodes E28 and E29 respectively have the functions of electrically connecting the charge detection electrodes C28 and C29 to the exterior of the vibrating element 2, and are arranged so as not to be opposed to each other with the piezoelectric substrate 22 sandwiched therebetween to prevent a large static capacitance from being generated between the pullout electrodes E28 and E29.

The piezoelectric substrates 21 and 22 are affixed to each other such that the charge detection electrodes C27 and C28 are opposed to each other with adhesives 23 having insulating properties sandwiched therebetween. The pullout electrodes E26 and E28 are exposed to one side surface of the vibrating element 2, and the pullout electrodes E27 and E29 are exposed to the other side surface of the vibrating element 2.

As shown in FIG. 8, the supporting region 91 positioned at one end of the vibrating element 2 is held between the first supporting members 3a and 3b, and the first supporting members 3a and 3b are held by the above-mentioned second supporting member 4, so that the supporting region 91 in the vibrating element 2 is supported to function as an acceleration sensor. That is, the free vibration region 92 in the vibrating element 2 is deflected by applied acceleration so that the piezoelectric substrates 21 and 22 are distorted. Charges are generated in the charge detection electrodes C26, C27, C28, and C29 by a piezoelectric effect, so that potential differences respectively occur between the charge detection electrodes C26 and C27 and between the charge detection electrodes C28 and C29. The acceleration can be detected by charges or a voltage thus generated.

The modulus of elasticity of the first supporting members 3a and 3b is preferably around 10 MPa to 10 GPa, and the modulus of elasticity of the second supporting member 4 is preferably around 10 to 500 GPa, as described above.

The pullout electrodes E26 and E28 are respectively exposed to one side surfaces of the piezoelectric substrates 21 and 22, and are electrically connected to an end 7a of a lead electrode 1a extending within the case 1 to the vicinity on one side surface of the vibrating element 2 through conductive adhesives 6a. The pullout electrodes E27 and E29 are respectively exposed to the other side surfaces of the piezoelectric substrates 21 and 22, and are electrically connected to an end 7b of a lead electrode 1b extending within the case 1 to the vicinity of the other side surface of the vibrating element 2 through conductive adhesives 6b.

This causes output voltages generated between the charge detection electrodes C26 and C27 and between the charge detection electrodes C28 and C29 to be respectively outputted to the exterior from the lead electrodes 1a and 1b.

The vibrating element 2 is mechanically fixed on its main surface and electrically connected on its side surface, and a space is efficiently utilized, so that the acceleration sensor can be made smaller in size.

Although in the above-mentioned embodiment, the acceleration sensor has the configuration in which the vicinity of one end in the longitudinal direction of the vibrating element is held between the supporting members, it may have a configuration in which both ends of the vibrating element are held between the supporting members, or it may have a configuration in which the vicinity at the center of the vibrating element is held between the supporting members.

Figure 16:
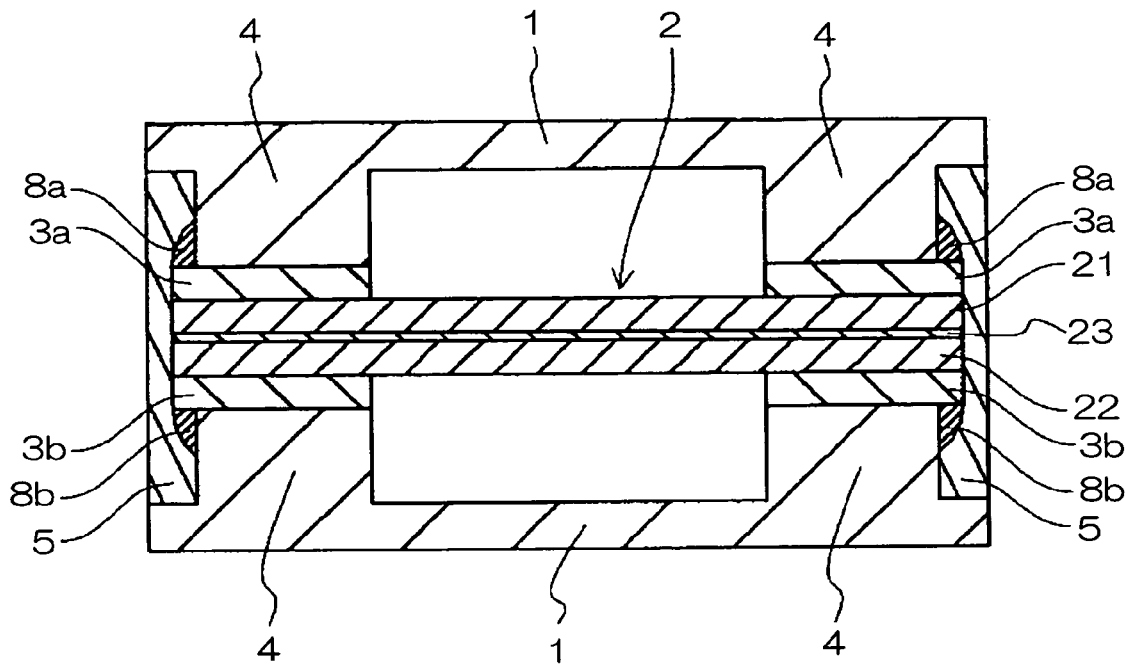
FIG. 16 is a cross-sectional view schematically showing an acceleration sensor according to still another embodiment of the present invention.
Figure 17:
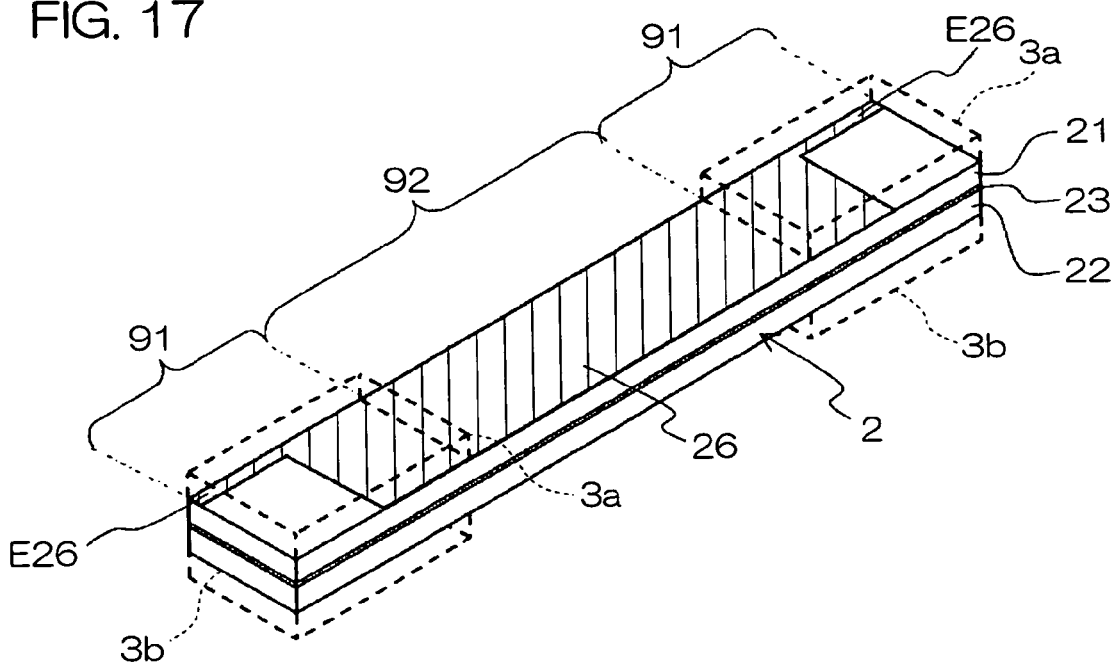
FIG. 17 is a perspective view schematically showing the appearance of a vibrating element and first supporting members used for the acceleration sensor shown in FIG. 16.
Figure 18:
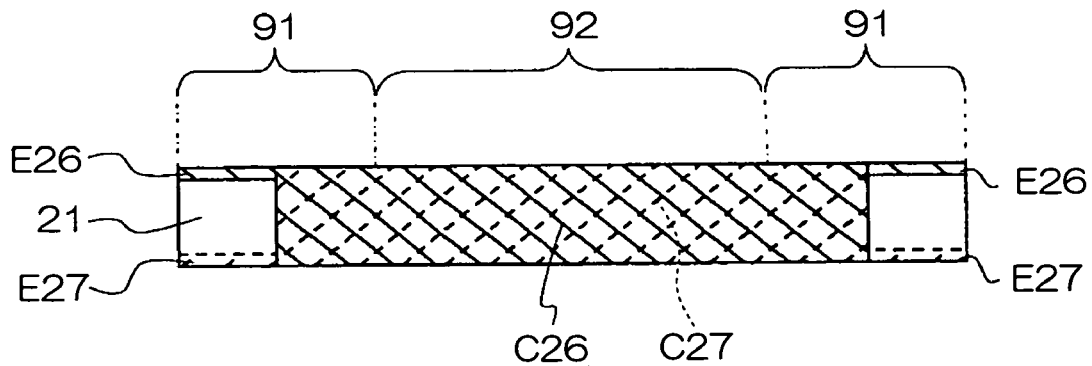
FIGS. 18 to 20 are respectively a perspective view as viewed from the top, a top view, and a bottom view, schematically showing a piezoelectric substrate and conductor films arranged on both main surfaces of the piezoelectric substrate, composing the vibrating element shown in FIG. 17.
Figure 19:
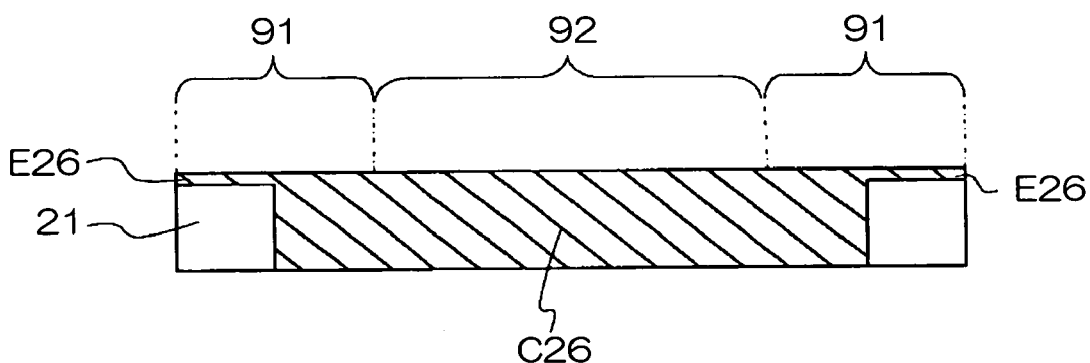
Figure 20:
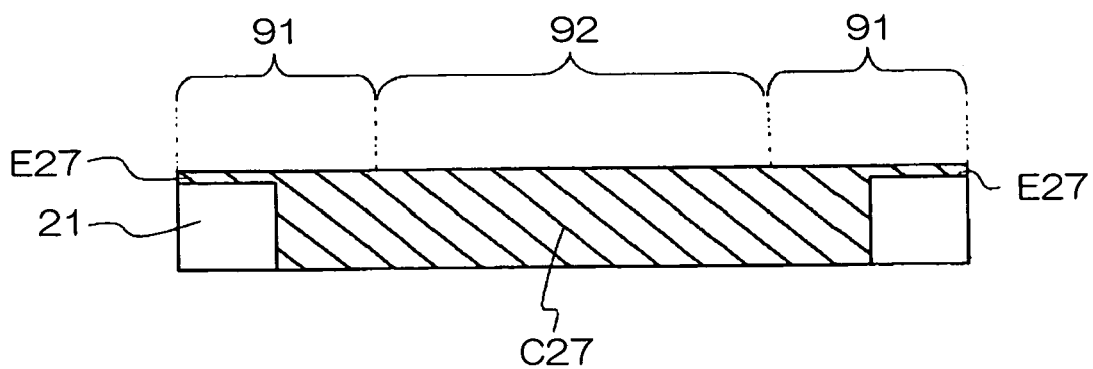
Figure 21:
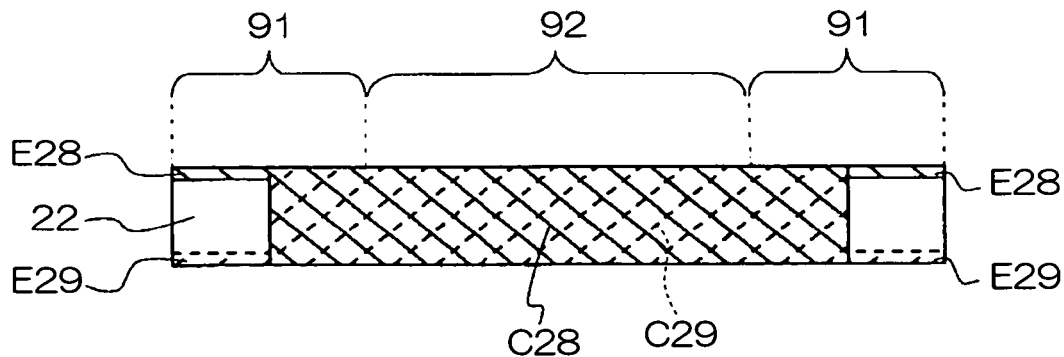
FIGS. 21 to 23 are respectively a perspective view as viewed from the top, a top view, and a bottom view, schematically showing another piezoelectric substrate and conductor films arranged on both main surfaces of the piezoelectric substrate, composing the vibrating element shown in FIG. 17.
Figure 22:
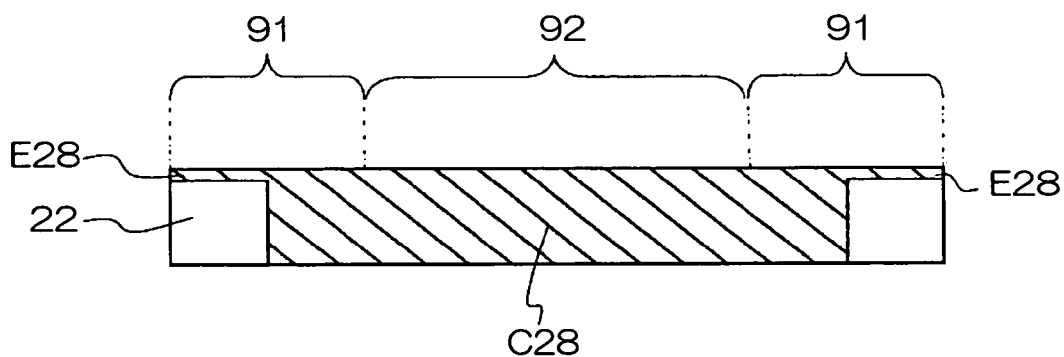
Figure 23:
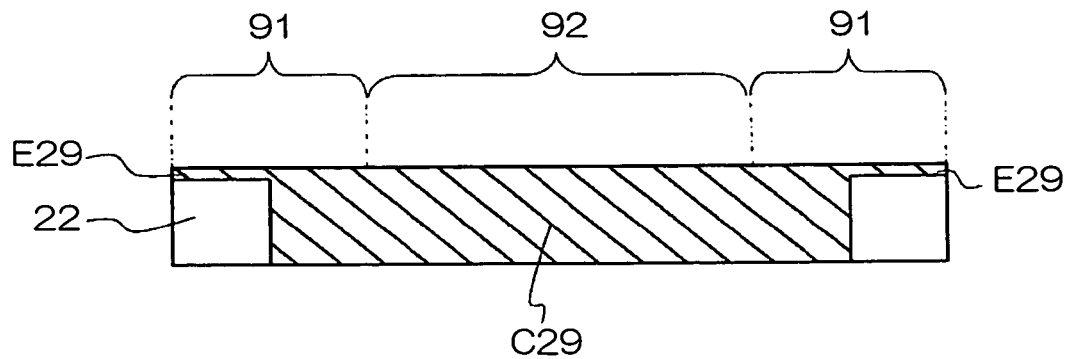

FIG. 16 is a cross-sectional view schematically showing an acceleration sensor according to still another embodiment of the present invention. FIG. 17 is a perspective view schematically showing the appearance of a vibrating element 2 and first supporting members 3a and 3b used for the acceleration sensor shown in FIG. 16. FIGS. 18, 19, and 20 are respectively a perspective view as viewed from the top, a top view, and a bottom view, schematically showing a piezoelectric substrate 21 and conductor films 26 and 27 arranged on both main surfaces of the piezoelectric substrate 21, composing the vibrating element 2 shown in FIG. 17, and FIGS. 21, 22, and 23 are respectively a perspective view as viewed from the top, a top view, and a bottom view, schematically showing another piezoelectric substrate 22 and conductor films 28 and 29 arranged on both main surfaces of the piezoelectric substrate 22, composing the vibrating element 2 shown in FIG. 17.

In the present embodiment, only points different from those in the above-mentioned embodiment are described, and the same constituent elements are assigned the same reference numerals and hence, overlapped description is not repeated.

The characteristic feature of the acceleration sensor according to the present embodiment is that both ends in the longitudinal direction of the vibrating element 2 are supporting regions 91 supported by the first supporting members 3a and 3b and a second supporting member 4, and the center thereof is a free vibration region 92. The longitudinal length of the free vibration region 92 is larger than the length of the supporting region 91, and the center in the longitudinal direction of the free vibration region 92 is a maximum amplitude region. Also in this case, charge detection electrodes C26, C27, C28, and C29 are arranged from the free vibration region 92 to the middle of the supporting regions 91 so that acceleration detection sensitivity can be improved by the same mechanism as that in the above-mentioned example.

Figure 24:
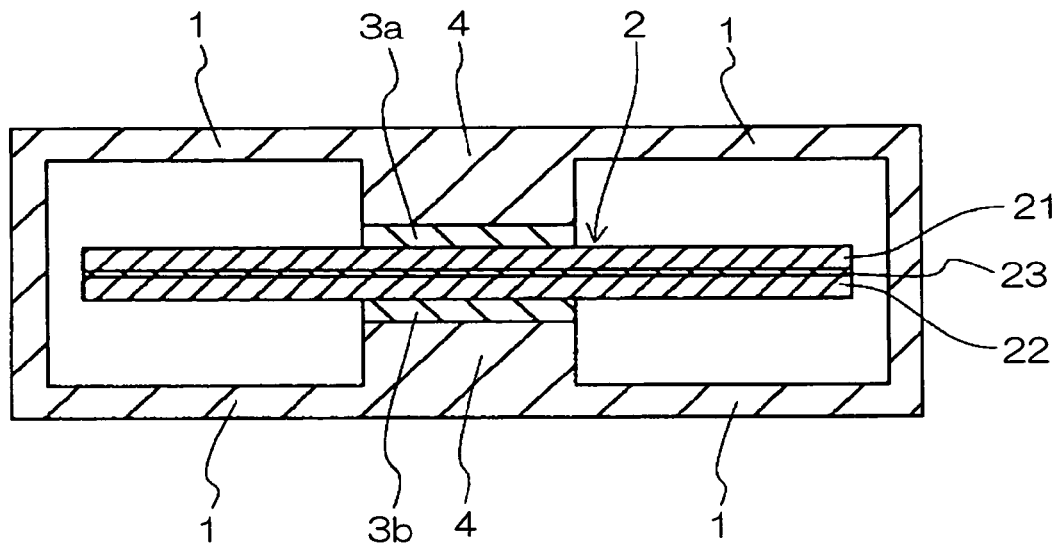
FIG. 24 is a cross-sectional view schematically showing an acceleration sensor according to still another embodiment of the present invention.
Figure 25:
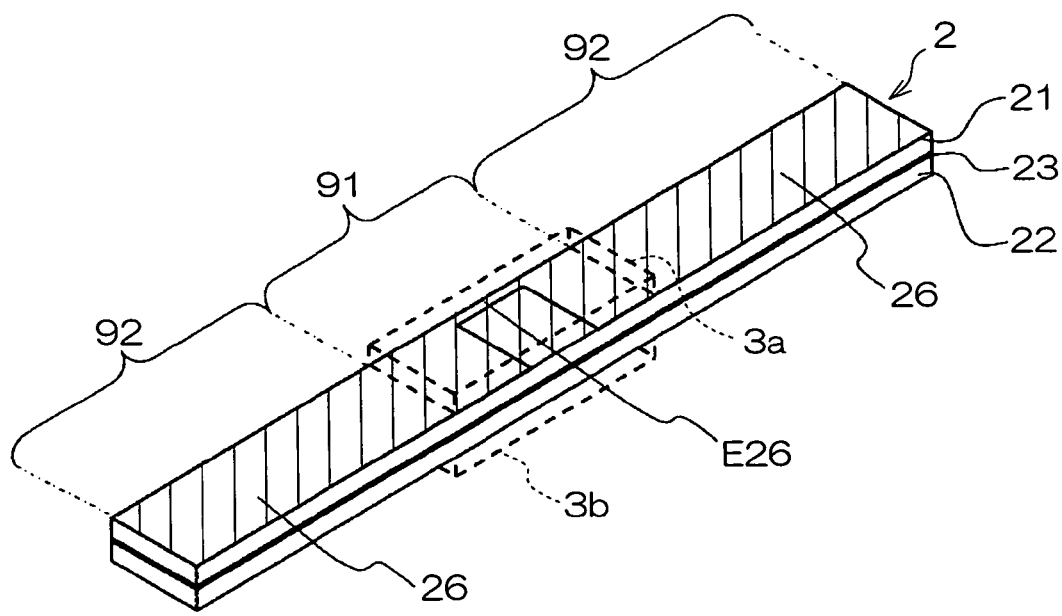
FIG. 25 is a perspective view schematically showing the appearance of a vibrating element and first supporting members used for the acceleration sensor shown in FIG. 24.
Figure 26:
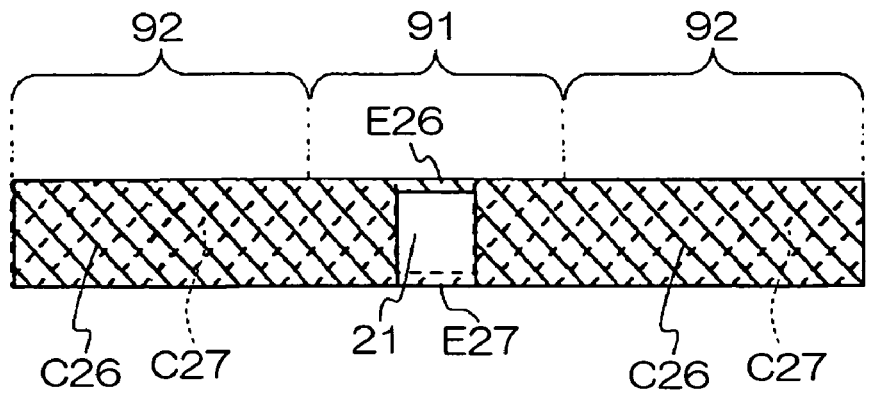
FIGS. 26 to 28 are respectively a perspective view as viewed from the top, a top view, and a bottom view, schematically showing a piezoelectric substrate, composing the vibrating element shown in FIG. 25.
Figure 27:
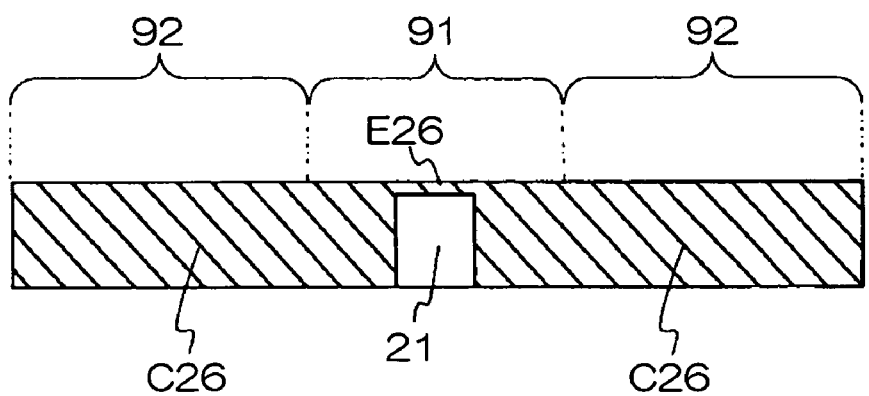
Figure 28:
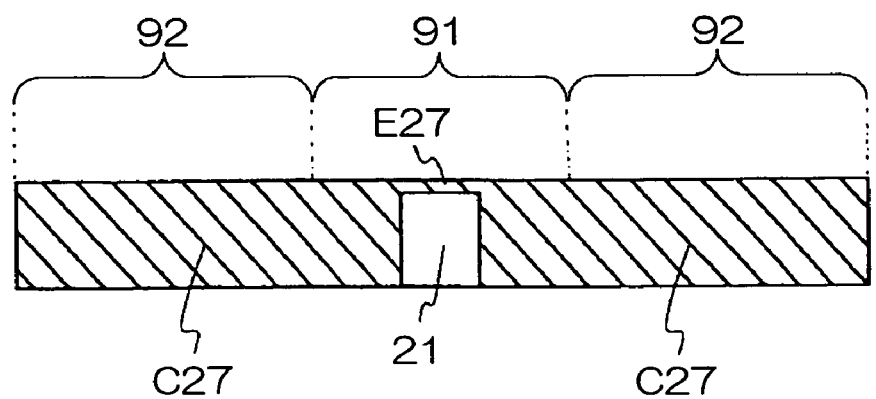
Figure 29:
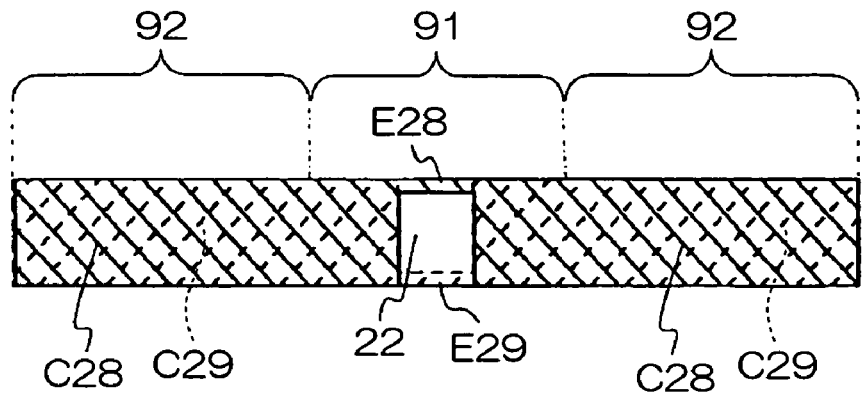
FIGS. 29 to 31 are respectively a perspective view as viewed from the top, a top view, and a bottom view, schematically showing another piezoelectric substrate, composing the vibrating element shown in FIG. 25.
Figure 30:
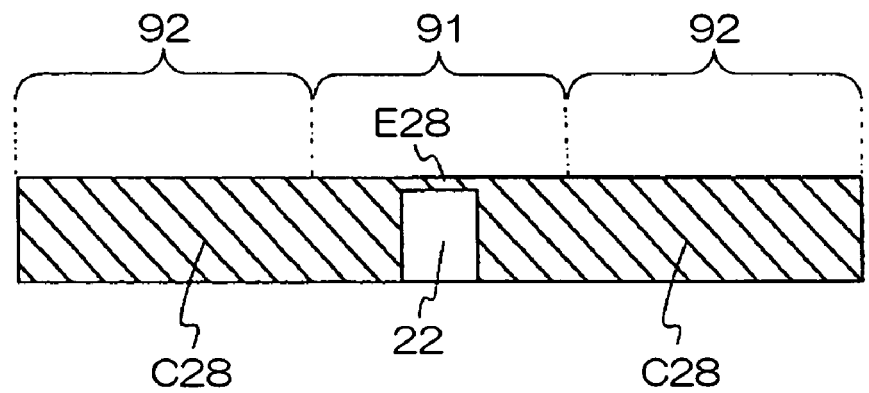
Figure 31:
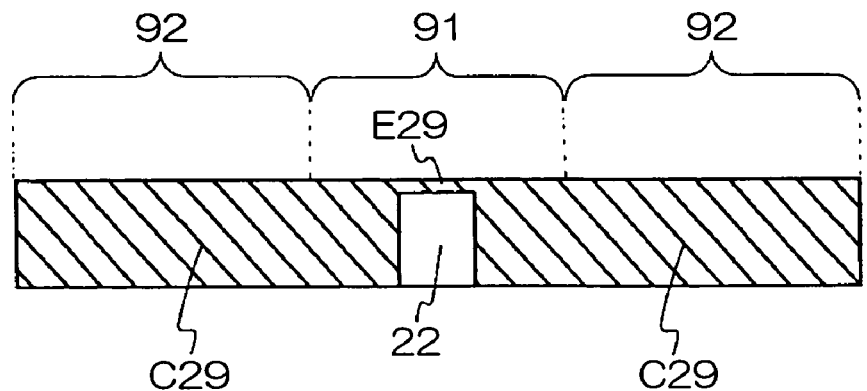

FIG. 24 is a cross-sectional view schematically showing an acceleration sensor according to still another embodiment of the present invention. FIG. 25 is a perspective view schematically showing the appearance of a vibrating element 2 and first supporting members 3a and 3b used for the acceleration sensor shown in FIG. 24. FIGS. 26, 27, and 28 are respectively a perspective view as viewed from the top, a top view, and a bottom view, schematically showing a piezoelectric substrate 21 and conductor films 26 and 27 arranged on both main surfaces of the piezoelectric substrate 21, composing the vibrating element 2 shown in FIG. 25, and FIGS. 29, 30, and 31 are respectively a perspective view as viewed from the top, a top view, and a bottom view, schematically showing another piezoelectric substrate 22 and conductor films 28 and 29 arranged on both main surfaces of the piezoelectric substrate 22, composing the vibrating element 2 shown in FIG. 25.

In the present embodiment, only points different from those in the above-mentioned embodiment are also described, and the same constituent elements are assigned the same reference numerals and hence, overlapped description is not repeated.

The characteristic feature of the acceleration sensor according to the present embodiment is that the center in the longitudinal direction of the vibrating element 2 is a supporting region 91 supported by the first supporting members 3a and 3b and a second supporting member 4, and both sides of the supporting region 91 are free vibration regions 92. In this case, both ends in the longitudinal direction of the vibrating element 2 are maximum amplitude regions. Also in this case, charge detection electrodes C26, C27, C28, and C29 are arranged from the free vibration regions 92 to the middle of the supporting region 91 so that acceleration detection sensitivity can be improved by the same mechanism as that in the above-mentioned example.

Description is then made of an example of the manufacture of the acceleration sensor according to the present invention.

First, a binder was added to raw material powder of lead zirconate titanate, a mixture obtained was pressed and was calcined at a peak temperature of 1200° C. for 24 hours, to obtain a block of a piezoelectric body.

The block was then sliced using a wire saw, and both surfaces of the sliced block were further lapped using a lap machine, to produce a piezoelectric mother substrate that will be a piezoelectric substrate if it is divided. The thickness of the piezoelectric mother substrate was set to 100 μm.

Metal thin films each divided into conductor films 26 to 29 were formed on both main surfaces of the piezoelectric mother substrate using a sputtering device. Each of the metal thin films has a two-layer structure of chromium and silver, and was obtained by forming a chromium thin film to a thickness of 0.3 μm and then forming a silver thin film thereon to a thickness of 0.3 μm.

The piezoelectric mother substrate was then put into a polarization tank, and was subjected to polarization processing in the thickness direction by applying a voltage of 300 V for 10 seconds.

After a resist pattern was then formed on a surface of a metal thin film using a screen printing method, was then dipped into an etchant to pattern the metal thin film, and was then dipped into toluene to remove resist.

Two piezoelectric mother substrates each having a pattern of a metal thin film formed on both its main surfaces were put into a vacuum oven, were affixed to each other with a prepreg of glass fiber-filled epoxy resin interposed therebetween, and were held and joined to each other at 180° C. for two hours while applying a load. In affixing the two piezoelectric mother substrates, the directions of polarization in the two piezoelectric substrates were set to opposite directions.

Epoxy resin serving as the first supporting members 3a and 3b was then applied to a predetermined position on the piezoelectric mother substrate using a screen printing machine, and was held and cured at 150° C. for two hours.

The piezoelectric mother substrate was then divided into pieces using a dicing saw, to simultaneously obtain a plurality of vibrating elements 2 each having first supporting members 3a and 3b made to adhere to both its main surfaces at an end in the longitudinal direction, as shown in FIG. 8.

A case 1 composed of LCP (liquid crystal polymer) comprising lead electrodes 1a and 1b composed of phosphor bronze insert molded and having a second supporting member 4 integrally formed therein in the vicinity of an opening 1h was then prepared, and the vibrating element 2 to which the first supporting members 3a and 3b have adhered was pressed into the a through hole 4h in the second supporting member 4 and fixed thereto, as shown in FIGS. 5 and 6.

As shown in FIG. 5, weirs 8a and 8b composed of epoxy resin were applied to the vicinity of the center on an upper surface of the exposed first supporting member 3a and the vicinity of the center on a lower surface of the first supporting member 3b, and conductive adhesives 6a and 6b composed of epoxy resin and a silver filler were applied to both side surfaces of the vibrating element 2 exposed to recesses 4a and 4b of the second supporting member 4, respectively using a dispenser, and they were held and cured at 200° C. for thirty minutes.

As shown in FIG. 1, sealing resin 5 composed of epoxy resin was then applied to the opening 1h in the case 1 using a dispenser so as to cover the vibrating element 2, the first supporting members 3a and 3b, the weirs 8a and 8b, the conductive adhesives 6a and 6b, and the second supporting member 4, was held and cured at 150° C. for two hours, to complete an acceleration sensor.

Shock was applied to the acceleration sensor thus manufactured to evaluate electrical characteristics thereof, confirming that the acceleration sensor has properties superior to those of the conventional acceleration sensor.

Figure 32:
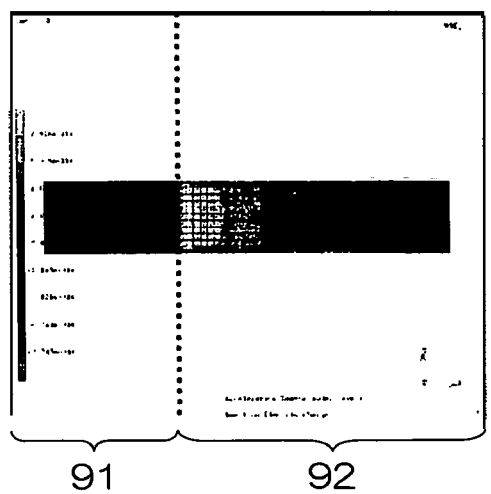
FIGS. 32 to 34 are diagrams showing the results of simulation of the distribution of charges generated on a surface of the vibrating element in a case where shock is applied to an acceleration sensor.
Figure 33:
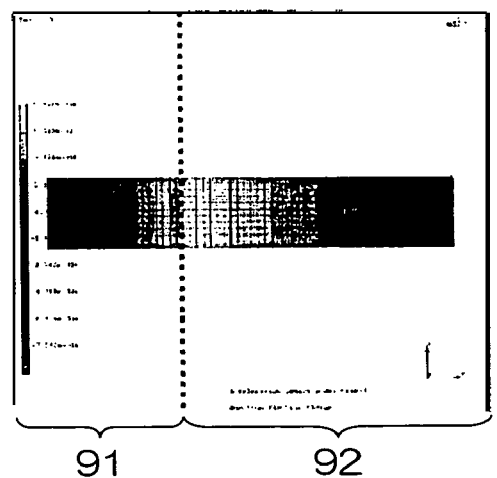
Figure 34:
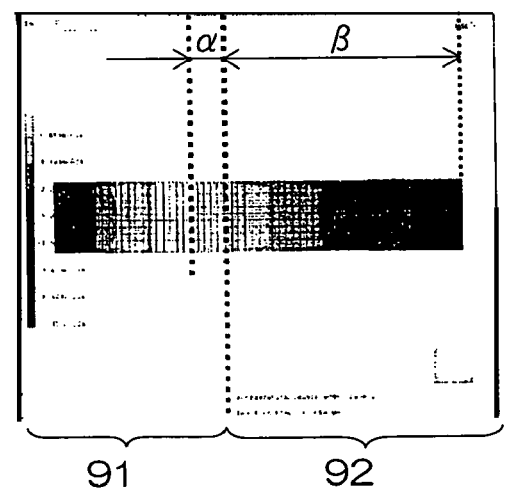

FIGS. 32, 33, and 34 are diagrams respectively showing simulation examples using a finite element method carried out so as to confirm the effect of enhancing the pressure detection sensitivity of the acceleration sensor according to the present invention.

The distribution of charges generated on a surface of the vibrating element 2 when shock is applied to the acceleration sensor is indicated by a white region. The higher the density of the generated charges is, the whiter the region becomes.

In this simulation, the length, the width, and the thickness of the vibrating element 2 were respectively taken as 3 mm, 0.5 mm, and 0.3 mm, the length of the supporting region 91 that is held between the first supporting members 3a and 3b was taken as 1 mm, the length of the free vibration region 92 that is not held between the first supporting members 3a and 3b was taken as 2 mm, and the thickness of the supporting member 1 was taken as 30 μm.

FIG. 33 is a diagram showing the results of simulation of the acceleration sensor according to the present invention shown in FIGS. 1 to 6, where the left side and the right side of a broken line are respectively a supporting region 91 and a free vibration region 92, and the respective moduli of elasticity of the first supporting member and the second supporting member were 4 GPa and 500 GPa.

FIG. 32 is a diagram showing the results of simulation of the conventional acceleration sensor for comparison, where the left side and the right side of a broken line are respectively a supporting region 91 and a free vibration region 92, and the modulus of elasticity of the supporting member is 500 GPa.

In the conventional acceleration sensor shown in FIG. 32, charges are almost generated in only the free vibration region 92, and are concentrated in the vicinity of the supporting region 91. This shows that the piezoelectric substrates 21 and 22 are not distorted within the supporting region 91, and the vibrating element 2 is not deflected within the supporting region 91. Further, this shows that the distortion of the piezoelectric substrates 21 and 22 increases toward the vicinity of the supporting region 91 in the free vibration region 92 in the vibrating element 2, while the piezoelectric substrates 21 and 22 are hardly distorted in the vicinity of a free end of the vibrating element 2. That is attributed to the difference between moments of forces respectively applied to the places. It is considered that the vicinity of the free end of the vibrating element only functions as a weight.

On the other hand, in the acceleration sensor according to the present invention shown in FIG. 33, charges are also generated in the vicinity of the free vibration region 92 within the supporting region 91. This shows that the piezoelectric substrates 21 and 22 within the supporting region 91 are also distorted, that is, the vibrating element 2 is also deflected within the supporting region 91. This is attributed to the fact that the first supporting members 3a and 3b are easily deformed by a force received from the vibrating element 2 because the first supporting members 3a and 3b are composed of an elastic body and have a modulus of elasticity lower than that of the second supporting member 4, so that the vibrating element 2 can be also deflected within the supporting region 91.

FIGS. 35, 36, and 37 are partially sectional views each schematically showing how the vibrating element 2 in the acceleration sensor according to the present invention and the conventional acceleration sensor are deformed.

It is considered that the results of simulation shown in FIGS. 32 and 33 are obtained because the vibrating element 2 is mainly deflected in a very limited range indicated by L0 in the free vibration region 92 in the conventional acceleration sensor shown in FIG. 35, while the vibrating element 2 is deflected in a wide range indicated by L1 from the middle of the supporting region 91 to the free vibration region 92 in the acceleration sensor according to the present invention shown in FIG. 36.

In the acceleration sensor according to the present invention, charges are thus generated even in a part of the supporting region 91, so that a region where charges are generated in the vibrating element 2 becomes wider, as compared with that in the conventional acceleration sensor. Therefore, the amount of charges generated in the vibrating element 2 is increased, so that acceleration detection sensitivity can be enhanced without changing the size of the vibrating element 2 and reducing the mechanical strength of the vibrating element 2.

In the acceleration sensor according to the present invention shown in FIGS. 1 to 6, the results of simulation of changes in acceleration detection sensitivity (the amount of charges generated in the charge detection electrode per acceleration of 1 G) in a case where the modulus of elasticity of the first supporting members 3a and 3b and the modulus of elasticity of the second supporting member 4 are varied are shown in Table 1. Various types of conditions other than the modulus of elasticity in the simulation are as described above:

TABLE 1

| Modulus of elasticity of first supporting member (GPa) | Modulus of elasticity of second supporting member (GPa) | High-low relationship in modulus of elasticity of supporting member | Charge sensitivity (pC/G) |
| --- | --- | --- | --- |
| 3 | 3 | first = second | 0.282 |
| 3 | 30 | first < second | 0.311 |
| 3 | 300 | first < second | 0.313 |
| 30 | 3 | first > second | 0.267 |
| 30 | 30 | first = second | 0.283 |
| 30 | 300 | first < second | 0.287 |
| 300 | 3 | first > second | 0.251 |
| 300 | 30 | first > second | 0.260 |
| 300 | 300 | first = second | 0.269 |

In Table 1, in a case where the modulus of elasticity of the first supporting members 3a and 3b is 3 GPa, as the modulus of elasticity of the second supporting member 4 increases from 3 GPa to 30 GPa and 300 GPa, the charge sensitivity is improved from 0.282 to 0.311 and 0.313 in this order. In a case where the modulus of elasticity of the first supporting members 3a and 3b is 30 GPa and 300 GPa, the charge sensitivity is also similarly improved as the modulus of elasticity of the second supporting member 4 increases. This shows that the charge sensitivity is improved by the increase in the modulus of elasticity of the second supporting member 4.

In a case where the modulus of elasticity of the second supporting member 4 is 3 GPa, as the modulus of elasticity of the first supporting members 3a and 3b increases from 3 GPa to 30 GPa and 300 GPa, the charge sensitivity is degraded from 0.282 to 0.267 and 0.251 in this order. In a case where the modulus of elasticity of the second supporting member 4 is 30 GPa and 300 GPa, the charge sensitivity is also similarly degraded as the modulus of elasticity of the first supporting members 3a and 3b increases. This shows that the charge sensitivity is improved by the decrease in the modulus of elasticity of the first supporting members 3a and 3b.

Furthermore, when the charge sensitivities in Table 1 are arranged in ascending order, they are 0.251, 0.26, 0.267, 0.269, 0.282, 0.283, 0.287, 0.311, and 0.313. The 0.251, 0.26, and 0.267 are charge sensitivities in a case where the modulus of elasticity of the first supporting members 3a and 3b is higher than the modulus of elasticity of the second supporting member 4 (first>second), 0.269, 0.282, and 0.283 are charge sensitivities in a case where the modulus of elasticity of the first supporting members 3a and 3b is equal to the modulus of elasticity of the second supporting member 4 (first=second), and 0.287, 0.311, and 0.313 are charge sensitivities in a case where the modulus of elasticity of the first supporting members 3a and 3b is lower than the modulus of elasticity of the second supporting member 4 (first<second). From the results, it can be confirmed that the high-low relationship between the modulus of elasticity of the first supporting members 3a and 3b and the modulus of elasticity of the second supporting member 4 exerts a dominant effect on the charge sensitivity, and acceleration detection sensitivity is improved by making the modulus of elasticity of the first supporting members 3a and 3b lower than the modulus of elasticity of the second supporting member 4.

FIG. 34 shows the results of simulation of the distribution of changes generated on a surface of the vibrating element 2 in a case where shock is applied to the acceleration sensor having a configuration in which the first supporting members 3a and 3b extend toward the free end farther than the second supporting member 4, as shown in FIG. 7.

In FIG. 34, the left side of a left broken line is a region held by the first supporting members 3a and 3b and the second supporting member 4, a region between the left broken line and a right broken line is a region held only by the first supporting members 3a and 3b, and the right side of the right broken line is the free vibration region 92.

In this simulation, the modulus of elasticity of the first supporting members 3a and 3b is 4 GPa, and the modulus of elasticity of the second supporting member 4 is 500 GPa, as in the case shown in FIG. 33.

As apparent from comparison with FIG. 33, a region where charges are generated further becomes larger, as compared with that in the acceleration sensor having the configuration shown in FIGS. 1 to 6. That is, it is considered that the vibrating element 2 is deflected over a wide range indicated by L2 so that a charge generation region is further widened, as schematically shown in FIG. 37 how the vibrating element 2 is deformed in the acceleration sensor having the configuration shown in FIG. 7.

Moreover, in the acceleration sensor having the configuration shown in FIG. 7, the modulus of elasticity of the second supporting member 4 is set to a value larger than the modulus of elasticity of the first supporting members 3a and 3b. Therefore, the second supporting member 4 is hardly deformed, and the problem "the deformation of the vibrating element 2 is restrained by the deformation of the second supporting member 4, resulting in reduced acceleration detection sensitivity" does not arise.

Figure 38:
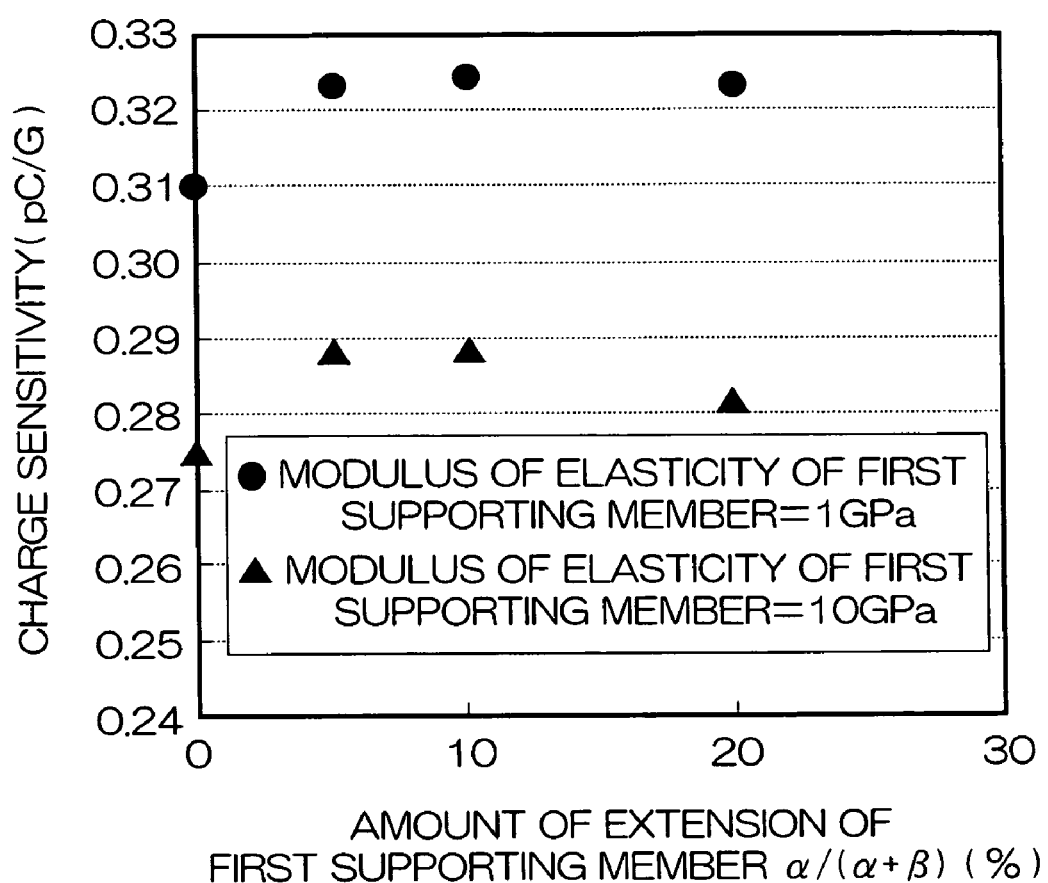
FIG. 38 is a graph showing the results of simulation of the change in acceleration detection sensitivity in a case where the amount of extension of a first supporting member is varied in the acceleration sensor according to the embodiment shown in FIG. 7 of the present invention.

FIG. 38 is a graph showing the results of simulation of the change in acceleration detection sensitivity in a case where the amount of extension α of the first supporting members 3a and 3b from the second supporting member 4 in the acceleration sensor shown in FIG. 7. A length from an end surface of the first supporting members 3a and 3b to the free end of the vibrating element 2 is indicated by β.

In this graph, the horizontal axis indicates the ratio of the amount of extension of the first supporting members 3a and 3b to a length from an end surface of the second supporting member 4 to the free end of the vibrating element 2 (α/(α+β) in FIG. 7), and the vertical axis indicates acceleration detection sensitivity (the amount of charges generated in the charge detection electrode per acceleration of 1 G).

In this simulation, calculation was made, respectively taking the length, the width, and the thickness of the vibrating element 2 as 3 mm, 0.5 mm, and 0.3 mm, taking the thickness of the supporting member 1 as 30 µm, taking the modulus of elasticity of the second supporting member 4 as 300 GPa, and taking the length of the region held by the second supporting member 4 as 1 mm.

This simulation makes it possible to confirm that the acceleration detection sensitivity can be enhanced by extending the first supporting members 3a and 3b toward the free end farther than the second supporting member 4, as shown in FIG. 38.

Particularly, it is found that the acceleration detection sensitivity in a case where the modulus of elasticity of the first supporting members 3a and 3b is 1 GPa is higher than that in a case where it is 10 GP. As apparent from a graph shown in FIG. 38, the amount of extension of the first supporting members 3a and 3b from the second supporting member 4 is preferably in a range of 5 to 10% so that the acceleration detection sensitivity can be further enhanced.

Figure 39:
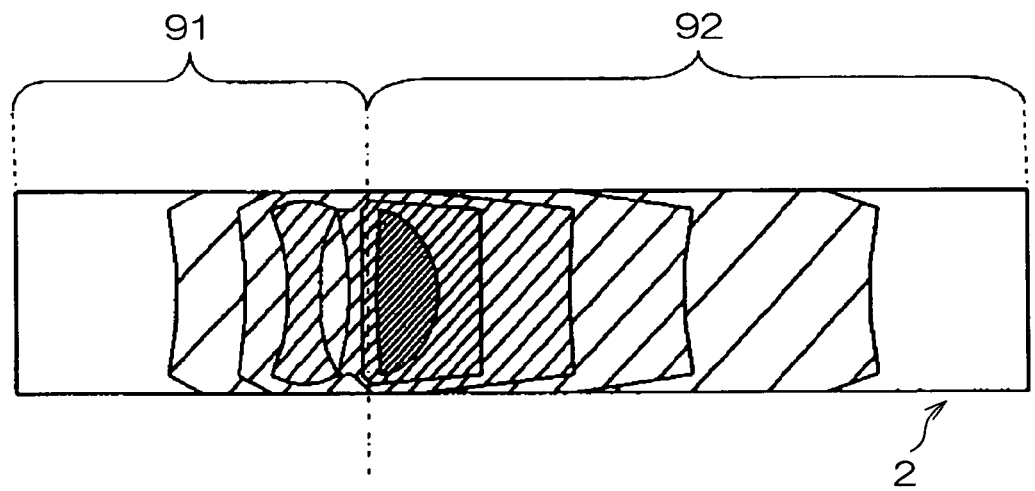
FIG. 39 is a diagram showing the results of simulation of the distribution of charges generated on a surface of a vibrating element in a case where acceleration is applied to the acceleration sensor according to the embodiment shown in FIGS. 1 to 6 of the present invention.
Figure 39:
Figure 39:
Figure 39:
Figure 39:
Figure 39:
Figure 39:
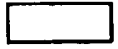

FIG. 39 is a diagram schematically showing the results of another simulation of the distribution of charges generated on the surface of the vibrating element 2 when acceleration is applied to the acceleration sensor having the configuration shown in FIGS. 1 to 6 using a fine element method. The higher the density of the generated charges is, the thinner hatching used for display is.

In this simulation, the length, the width, and the thickness of the vibrating element 2 were respectively taken as 3 mm, 0.5 mm, and 0.3 mm, the length of the supporting region 91 that is held between the first supporting members 3a and 3b was taken as 1 mm, the length of the free vibration region 92 that is not held between the first supporting members 3a and 3b was taken as 2 mm, and the thickness of the first supporting members 3a and 3b was taken as 30 µm. The modulus of elasticity of the first supporting members 3a and 3b was taken as 4 GPa, and the modulus of elasticity of the second supporting member 4 was taken as 500 GPa.

In FIG. 39, the left side and the right side of a one-dot and dash line are respectively a supporting region 91 and a free vibration region 92.

As apparent from the results shown in FIG. 39, it can be confirmed that charges are also generated in not only the free vibration region 92 but also a portion, in close proximity to the free vibration region 92, within the supporting region 91. This shows that the piezoelectric substrate within the supporting region 91 is also distorted, that is, the vibration region 2 is also deflected within the supporting region 91.

Conversely, it can be also confirmed that the vibrating element 2 is not deflected at a front end of the free vibration region 92 and a portion, opposite to the free vibration region 92, within the supporting region 91 so that charges are hardly generated because the piezoelectric substrate is not distorted.

In the acceleration sensor having the electrode structure shown in FIGS. 8 to 15, the charge detection electrodes C26 and C27 and the charge detection electrodes C28 and C29, opposed to each other, with the piezoelectric substrates 21 and 22 respectively sandwiched therebetween from the free vibration region 92 to the middle of the supporting region 91 in the vibrating element 2. That is, the charge detection electrodes C26, C27, C28, and C29 are arranged in a portion, in close proximity to the free vibration region 92, within the supporting region 91, and the charge detection electrodes C26, C27, C28, and C29 are not arranged in a portion, spaced apart from the free vibration region 92, within the supporting region 91.

The charge detection electrodes C26, C27, C28, and C29 are also arranged in the portion, in close proximity to the free vibration region 92, within the supporting region 91, so that charges generated in the portion, in close proximity to the free vibration region 92, within the supporting region 91, together with the charges generated in the free vibration region 92, are also accepted in the charge detection electrodes C26, C27, C28, and C29, so that the amount of charges stored in the charge detection electrodes C26, C27, C28, and C29 is increased, and potential differences respectively occurring between the charge detection electrodes C26 and C27 and between the charge detection electrodes C28 and C29 are also increased. Accordingly, charges and a voltage generated by applied acceleration are increased, so that an acceleration sensor having high acceleration detection sensitivity can be obtained.

The charge detection electrodes C26, C27, C28, and C29 are not arranged in the portion, spaced apart from the free vibration region 92, within the supporting region 91, so that the area of the charge detection electrodes C26, C27, C28, and C29 is reduced so that respective static capacitances between the charge detection electrodes C26 and C27 and between the charge detection electrodes C28 and C29 are reduced, as compared with those in a case where the charge detection electrodes C26, C27, C28, and C29 are also arranged in the portion, spaced apart from the free vibration region 92, in the supporting region 91.

Moreover, even if the charge detection electrodes C26, C27, C28, and C29 are not arranged in the portion, spaced apart from the free vibration region 92, within the supporting region 91, the amount of charges stored in the charge detection electrodes C26, C27, C28, and C29 is hardly reduced, as compared with that in a case where the charge detection electrodes C26, C27, C28, and C29 are arranged in the portion, spaced apart from the free vibration region 92, within the supporting region 91.

Accordingly, the respective potential differences occurring between the charge detection electrodes C26 and C27 and between the charge detection electrodes C28 and C29 are increased, so that an acceleration sensor having high sensitivity (voltage sensitivity) in a case where applied acceleration is detected by a voltage.

Figure 40:
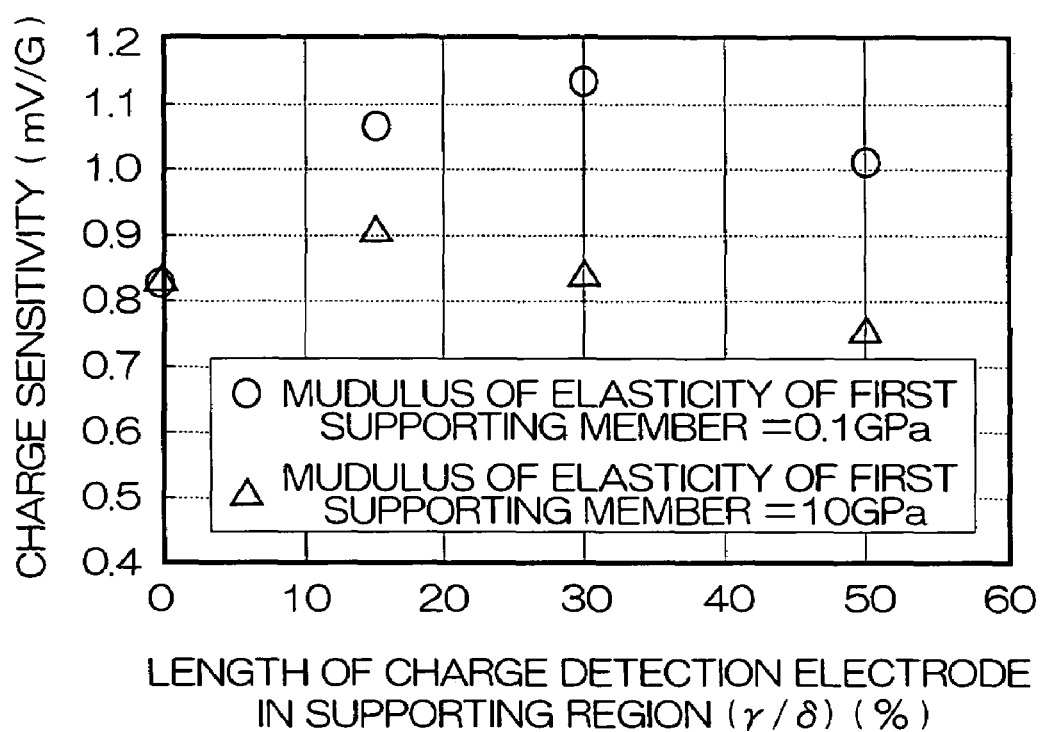
FIG. 40 is a graph showing the results of simulation of the change in voltage sensitivity in a case where the amount of extension of a charge detection electrode into a supporting region is changed in the acceleration sensor according to the embodiment shown in FIGS. 8 to 15 of the present invention.

FIG. 40 is a graph showing the results of simulation of the change in acceleration detection sensitivity in a case where the amount of extension $\gamma$ of each of the charge detection electrodes C26, C27, C28, and C29 into the supporting region 91 is changed in the acceleration sensor having the electrode structure shown in FIGS. 8 to 15.

In this graph, the horizontal axis indicates the ratio of the amount of extension $\gamma$ of each of the charge detection electrodes C26, C27, C28, and C29 into the supporting region 91 to the length $\delta$ of the free vibration region 92 in the vibrating element 2 (the ratio $\gamma/\delta$ of $\gamma$ to $\delta$ shown in FIGS. 10 to 15), and the vertical axis indicates voltage sensitivity (a voltage generated between the charge detection electrodes C26 and C28 and the charge detection electrodes C27 and C29 per acceleration of 1 G). In this simulation, calculation was made, respectively taking the length, the width, and the thickness of the vibrating element 2 as 3 mm, 0.5 mm, and 0.3 mm, taking the length of the supporting region 91 as 1 mm, taking the length of the free vibrating region 92 as 2 mm, taking the thickness of the first supporting members 3a and 3b as 30 µm, and taking the modulus of elasticity of the second supporting member 4 as 300 GPa.

According to the graph shown in FIG. 40, it can be confirmed that the voltage sensitivity can be enhanced by extending each of the voltage detection electrodes C26, C27, C28, and C29 into the middle of the supporting region 91, although the degree thereof differs depending on the modulus of elasticity of the first supporting members 3a and 3b.

The lower the modulus of elasticity of the first supporting members 3a and 3b is, the larger the optimum value of the amount of extension $\gamma$ of each of the charge detection electrodes C26, C27, C28, and C29 into the supporting region 91 becomes. Correspondingly, there is a tendency for the voltage sensitivity in the optimum value to increase. This is attributed to the fact that when the modulus of elasticity of the first supporting members 3a and 3b is reduced, the first supporting members 3a and 3b are liable to be deformed by a force received from the vibrating element 2, so that the amount of deflection of the vibrating element 2 within the supporting region 91 is increased, and a region, where the piezoelectric substrates 21 and 22 are distorted, that is, a region where charges are generated, within the supporting region 91 is enlarged. Further, it can be confirmed that the ratio of the amount of extension $\gamma$ of each of the charge detection electrodes C26, C27, C28, and C29 into the supporting region 91 to the length $\delta$ of the free vibration region 92 is preferably in a range of 15 to 30%, which allows acceleration detection sensitivity to be further enhanced.

According to the acceleration sensor in the present embodiment, the modulus of elasticity of the first supporting members 3a and 3b that is brought into contact with the vibrating element 2 is made lower than the modulus of elasticity of the second supporting member 4, which allows acceleration detection sensitivity to be further enhanced. That is, the first supporting members 3a and 3b have a lower modulus of elasticity than the second supporting member 4. Therefore, the first supporting members 3a and 3b are easy to deform by a force received from the vibrating element 2 so that the vibrating element 2 is easy to deflect within the supporting region 91. Accordingly, the region, where the piezoelectric substrates 21 and 22 are distorted, within the supporting region 91 is enlarged, so that charges and an output voltage generated thereby are increased, which allows acceleration detection sensitivity to be enhanced. Moreover, the modulus of elasticity of the second supporting member 4 is made higher than the modulus of elasticity of the first supporting members 3a and 3b, so that the second supporting member 4 is difficult to deform. The difficulty of deforming the second supporting member 4 makes it possible to restrain the problem "the reduction in acceleration detection sensitivity caused by the fact that the vibrating element 2 is hardly deformed" because the second supporting member 4 is greatly deformed when shock is applied to the acceleration sensor, to absorb the shock.

Furthermore, according to the acceleration sensor in the present invention, in the vibrating element 2, the piezoelectric substrates 21 and 22 are laminated in the thickness direction, and the charge detection electrodes C27 and C28 are further arranged between the piezoelectric substrates 21 and 22 so as to be respectively opposed to the charge detection electrodes C26 and C29 on both main surfaces of the vibrating element 2 with the piezoelectric substrates sandwiched therebetween. This causes charges to be generated in the charge detection electrodes C26, C27, C28, and C29 arranged on both the main surfaces of the piezoelectric substrates 21 and 22 by applied acceleration, so that the amount of charges generated in the whole vibrating element 2 is increased, as compared with that in a case where the charge detection electrodes C28 and C29 do not exist, which allows charge sensitivity to be enhanced.

Furthermore, according to the acceleration sensor in the present invention, the piezoelectric substrates 21 and 22 respectively have first pullout electrodes E26 and E28, pulled out from the charge detection electrodes C26 and C28 to one side surfaces, arranged on their main surfaces and respectively have second pullout electrodes E27 and E29, pulled out from the charge detection electrodes C27 and C29 to the other side surfaces, arranged on the other main surfaces. Even in a configuration in which the piezoelectric substrates 21 and 22 are laminated in the thickness direction, and the charge detection electrodes C27 and C28 are arranged between the piezoelectric substrates, all the charge detection electrodes C26, C27, C28, and C29 can be also connected to the conductive adhesives 6a and 6b on both side surfaces of the vibrating element 2, respectively, through the pullout electrodes E26, E27, E28, and E29, and all the charge detection electrodes C26, C27, C28, and C29 can be electrically connected to the exterior of the acceleration sensor through the lead electrodes 1a and 1b. This eliminates the necessity of forming via holes for electrically connecting the charge detection electrodes C27 and C28 positioned between the piezoelectric substrates 21 and 22 to the exterior, for example, in the vibrating element 2. Therefore, an acceleration sensor having a simple configuration and capable of simplifying manufacturing steps can be obtained. The pullout electrodes E26, E27, E28, and E29 and the conductive adhesives 6a and 6b can be connected to each other on both side surfaces of the vibrating element 2, so that spacing between the conductive adhesives 6a and 6b can be made larger, as compared with that in a case where the pullout electrodes E26, E27, E28, and E29 are pulled out to an end surface of the vibrating element 2 and exposed thereto and are connected to the conductive adhesives 6a and 6b on the end surface of the vibrating element 2. This can reduce the possibility that an electrical short develops between the first pullout electrodes E26 and E28 and the second pullout electrodes E27 and E29 by the flow of the conductive adhesives 6a and 6b that have not been cured.

The present invention is not limited to the above-mentioned embodiment. Various changes and improvements are possible without departing from the scope of the present invention.

Although in the above-mentioned embodiment, the bimorph-type vibrating element having two piezoelectric substrates affixed to each other is employed, for example, more piezoelectric substrates may be laminated. Conversely, a mono-morph type or uni-morph type vibrating element may be used. In a case where the vibrating element is of the mono-morph type, the piezoelectric substrate may be subjected to polarization inversion in the thickness direction. In a case where the vibrating element is of the uni-morph type, a vibrating plate made of a metal or the like may be made to adhere to one main surface of the piezoelectric substrate.

Figure 41:
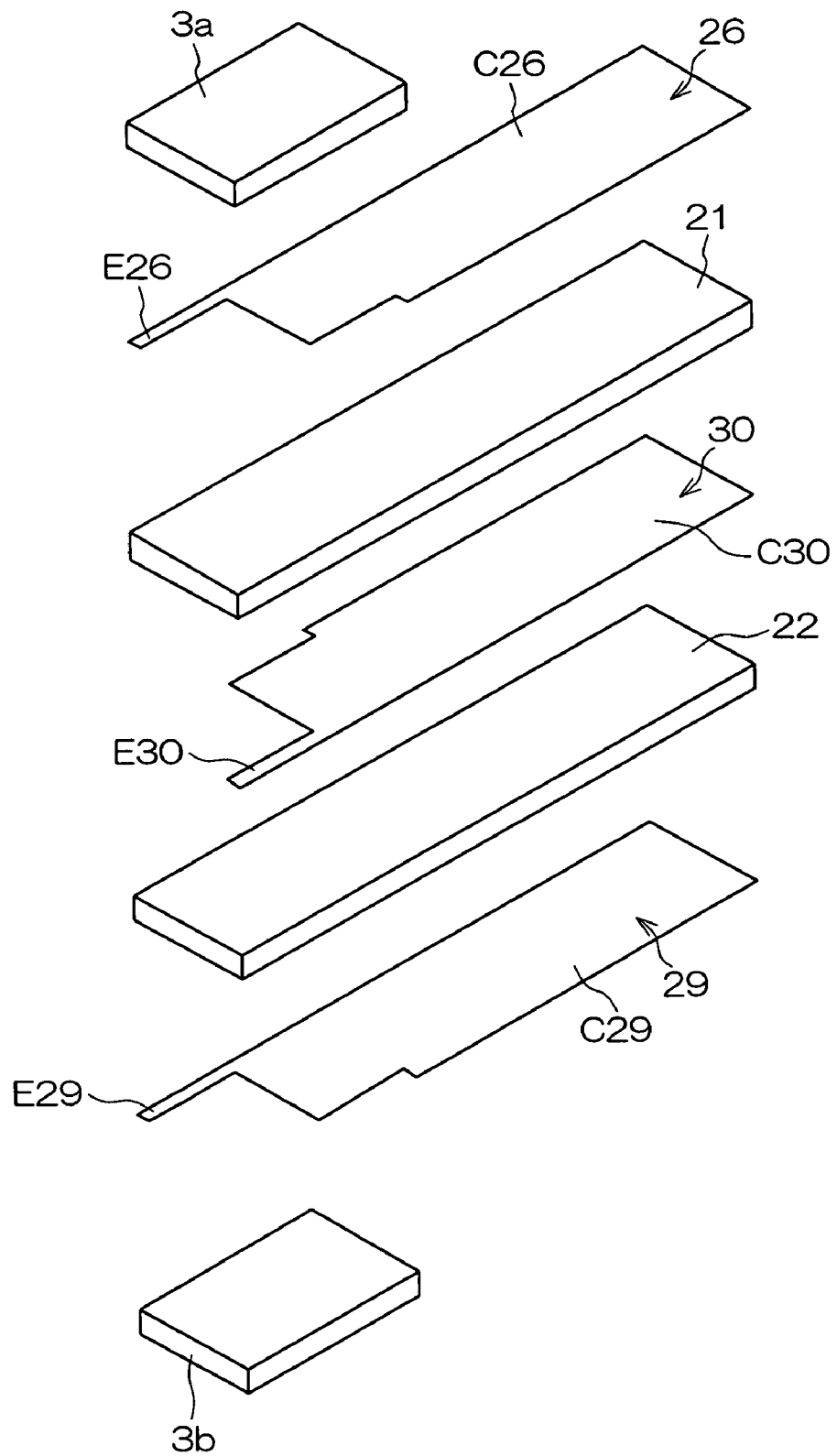
FIG. 41 is an exploded perspective view showing a vibrating element and first supporting members in an embodiment in which one charge detection electrode is arranged between two piezoelectric substrates in an acceleration sensor according to the present invention.

Although in the above-mentioned embodiment, the two charge detection electrodes C27 and C28 connected to different potentials are arranged between the two piezoelectric substrates 21 and 22 in a laminated body obtained by laminating the two piezoelectric substrates 21 and 22, as shown in FIG. 9, a charge detection electrode C30 may be arranged between two piezoelectric substrates, as shown in FIG. 41. In this case, charge detection electrodes C26 and C29 respectively arranged on outer main surfaces of the piezoelectric substrates 21 and 22 are connected to the same potential, and the directions of polarization of the two piezoelectric substrates 21 and 22 may be the same.

Furthermore, although in the above-mentioned embodiment, both the main surfaces of the vibrating element 2 are held between the first supporting members 3a and 3b, only one of the main surfaces of the vibrating element 2 may be fixed to a supporting member with adhesives or the like to support the vibrating element 2.

Furthermore, although in the above-mentioned embodiment, the first supporting members 3a and 3b are separately formed, they may be integrally formed so as to surround upper and lower surfaces and side surfaces of the vibrating element 2.

Furthermore, although in the above-mentioned embodiment, the first supporting members 3a and 3b and the second supporting member 4 that differ in materials constitute a supporting member, the supporting member may be composed of a single material depending on cases. However, it is considered that acceleration detection sensitivity is reduced to some extent, as compared with that in a case where the modulus of elasticity of the first supporting members 3a and 3b is made lower than the modulus of elasticity of the second supporting member 4.

Figure 42:
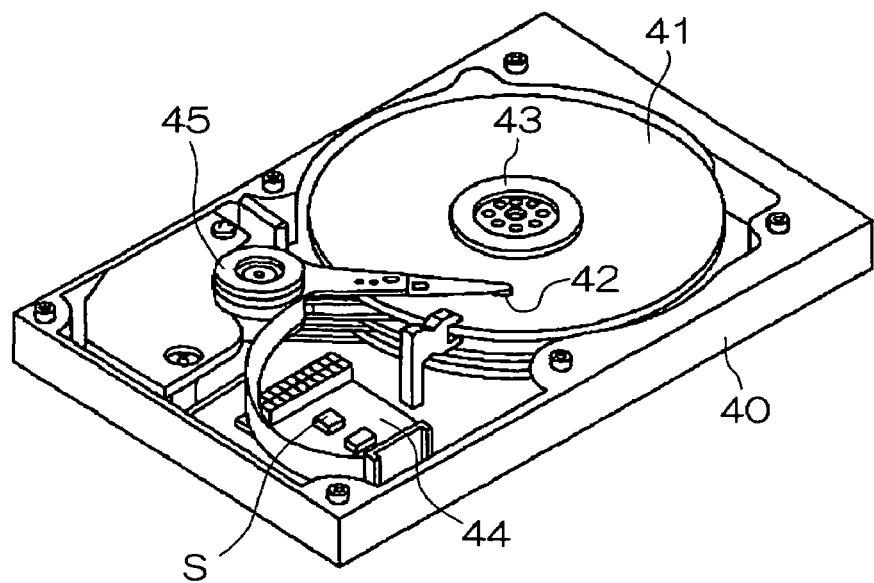
FIG. 42 is a perspective view showing the internal configuration of a magnetic disk device having an acceleration sensor mounted thereon.

FIG. 42 is a perspective view showing the internal configuration of a magnetic disk device.

The magnetic disk device (hereinafter referred to as HDD) has a rectangular box-shaped case whose upper surface is opened.

The case 40 accommodates a plurality of magnetic disks 41 serving as magnetic recording media, a spindle motor 43 for supporting and rotating the magnetic disks 41, a magnetic head 42 for recording/reproducing information on the magnetic disks 41, a head actuator 45 for supporting and positioning the magnetic head 42, a circuit board 44, and so on. An acceleration sensor S according to the present invention for detecting acceleration applied to the HDD is mounted on the circuit board 44.

Figure 43:
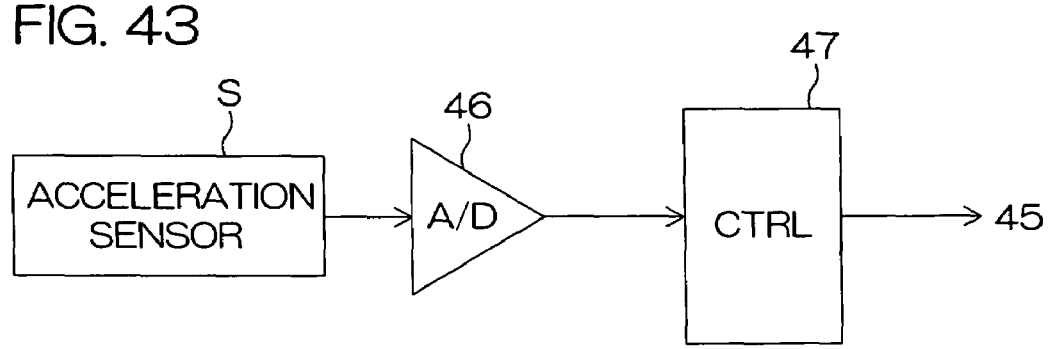
FIG. 43 is a block diagram showing a circuit for processing an acceleration detection signal of an acceleration sensor.

Furthermore, as shown in FIG. 43, the circuit board 44 comprises an A/D conversion circuit 46 for converting an analog signal from the acceleration sensor S into a digital signal, and a control circuit 47 for judging whether or not the magnetic head 42 is made to retreat on the basis of the signal from the A/D conversion circuit 46.

The acceleration sensor S always monitors the acceleration applied to the HDD, converts data representing the acceleration into a digital value in the A/D conversion circuit 46, and supplies the digital value to the control circuit 47. The control circuit 47 compares the acceleration data with a previously set threshold value, and feeds a retreat signal to the head actuator 45 to make the magnetic head 42 to retreat when it is judged that the acceleration data exceeds the threshold value. This allows the magnetic head 42 to retreat when strong acceleration is applied to the HDD during reading of data, which can previously prevent a failure in the HDD.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An acceleration sensor comprising:
    a vibrating element in which charge detection electrodes opposed to each other are arranged on both main surfaces of a piezoelectric substrate in a rectangular parallelepiped shape; and
    a first supporting member for supporting the vibrating element, the vibrating element including a supporting region supported in contact with the first supporting member, and a free vibration region having a longitudinal length larger than that in the supporting region and not supported by the first supporting member, and the first supporting member being composed of an elastic body.

2. The acceleration sensor according to claim 1, wherein a bending point of the vibrating element is positioned within the supporting region.

3. The acceleration sensor according to claim 1, wherein the modulus of elasticity of the first supporting member is 10 MPa to 10 GPa.

4. The acceleration sensor according to claim 1, further comprising a second supporting member for supporting the first supporting member in a direction perpendicular to both the main surfaces of the piezoelectric substrate, the modulus of elasticity of the first supporting member being lower than the modulus of elasticity of the second supporting member.

5. The acceleration sensor according to claim 4, wherein the modulus of elasticity of the first supporting member is 10 MPa to 10 GPa, and the modulus of elasticity of the second supporting member is 10 GPa to 500 GPa.

6. The acceleration sensor according to claim 1, further comprising a second supporting member for supporting the first supporting member in a direction perpendicular to both the main surfaces of the piezoelectric substrate, the first supporting member extending toward a maximum amplitude region of the vibrating element farther than the second supporting member.

7. The acceleration sensor according to claim 6, wherein letting $\alpha$ be the length by which the first supporting member extends farther than the second supporting member and $\beta$ be the length of the free vibration region in the longitudinal direction of the vibrating element, $0.05 \leq \alpha/(\alpha+\beta) \leq 0.1$.

8. The acceleration sensor according to claim 1, wherein the charge detection electrodes are arranged in the free vibration region and a portion, in close proximity to the free vibration region, within the supporting region on both main surfaces of the vibrating element.

9. The acceleration sensor according to claim 8, wherein letting $\gamma$ be the length of a portion, where the charge detection electrode is arranged, in the supporting region, and $\delta$ be the length of the free vibration region in the longitudinal direction of the vibrating element, $0.15 \leq \gamma/\delta \leq 0.3$.

10. The acceleration sensor according to claim 1, wherein the piezoelectric substrate in the vibrating element comprises a plurality of piezoelectric substrates laminated in the thickness direction, a charge detection electrode being further arranged between the piezoelectric substrates so as to be opposed to the charge detection electrodes with the piezoelectric substrates sandwiched therebetween.

11. The acceleration sensor according to claim 1, wherein each of the plurality of piezoelectric substrates has a first pullout electrode pulled out to its one side surface from the charge detection electrode arranged on its one main surface, and has a second pullout electrode pulled out to the other side surface from the charge detection electrode arranged on the other main surface.

12. A magnetic disk device, wherein the acceleration sensor according to claim 1 is carried thereon in order to detect acceleration applied to the magnetic disk device.

13. The magnetic disk device according to claim 12, further comprising a magnetic disk, a magnetic head for writing and reading data into and out of the magnetic disk, and a head actuator for supporting the magnetic head and positioning the supported magnetic head.

14. The magnetic disk device according to claim 12, comprising an analog-to-digital conversion circuit that converts an analog signal from the acceleration sensor into a digital signal, and a control circuit that judges whether or not the magnetic head is made to retreat on the basis of the signal from the analog-to-digital conversion circuit.

* * * * *